United States Patent
Shimoike et al.

(10) Patent No.: US 6,438,458 B2
(45) Date of Patent: *Aug. 20, 2002

(54) SUBSTRATE CONVEYING SYSTEM IN SEMICONDUCTOR MANUFACTURING APPARATUS

(75) Inventors: Hiroshi Shimoike, Tokyo; Takashi Nakahara, Machida, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 16 days.

(21) Appl. No.: 09/493,230

(22) Filed: Jan. 28, 2000

(30) Foreign Application Priority Data

Jan. 29, 1999 (JP) .......................................... 11-022828

(51) Int. Cl.⁷ .......................... G05B 19/04; G05B 19/18
(52) U.S. Cl. ........................ 700/250; 700/245; 700/260; 700/261; 700/262; 700/263; 355/72; 355/74; 355/78; 414/416; 414/935; 414/937; 701/23; 318/568.21
(58) Field of Search ................................ 700/245, 250, 700/213, 262, 260, 261; 318/568.21; 701/23; 355/72, 74, 78, 53; 414/416, 935, 937; 74/490.04, 490.09, 89.21; 901/19; 269/21, 206, 903

(56) References Cited

U.S. PATENT DOCUMENTS 5,669,977 A * 9/1997 Shufflebotham et al. .... 118/728
5,923,966 A * 7/1999 Teramoto et al. ........... 438/162
6,002,971 A * 12/1999 Lucas ......................... 700/250
6,086,734 A * 6/2000 Harada ....................... 414/416
6,149,984 A * 11/2000 Yamazaki et al. .......... 427/526

FOREIGN PATENT DOCUMENTS

JP 7-22502 1/1995
JP 11-312734 11/1999

OTHER PUBLICATIONS

Lee et al., Frequency Reshaped Quadratic Control Of A belt–Driven Robot, 1997, IEEE, p 124.*

Goldberg et al., Coupling Assebly Plans into Hard Automation, 1996, IEEE, pp. 1858–1863.*

M.Calin et al., Micro–Conveying Station for Assembly of Micro–Components, 1997, IEEE, pp. 1306–1311.*

* cited by examiner

Primary Examiner—William A. Cuchlinski, Jr.
Assistant Examiner—McDieunel Marc
(74) Attorney, Agent, or Firm—Fitzpatrick, Cella, Harper & Scinto

(57) ABSTRACT

A substrate conveying system wherein, at a substrate transfer position of a conveyance robot, a robot arm is moved upwardly at a normal speed from its lowermost position, and wherein the movement speed is changed to a lower speed at a predetermined position. During upward motion at the lower speed, the substrate is received and, while continuing the upward motion, the movement speed is changed back to the normal speed, at a second predetermined position. The robot arm continues its upward motion to its topmost position, with this normal speed.

44 Claims, 19 Drawing Sheets

SUBSTRATE CONVEYING SYSTEM IN SEMICONDUCTOR MANUFACTURING APPARATUS

FIELD OF THE INVENTION AND RELATED ART

This invention relates to a substrate conveying system, a substrate conveying method and/or a substrate conveying hand mechanism, for conveying a substrate such as a semiconductor wafer, for example. In another aspect, the invention is concerned with a semiconductor manufacturing apparatus having an arrangement for performing an ashing process by use of such a substrate conveying system, or a semiconductor device manufacturing method including an ashing process by use of such a substrate conveying system.

In some semiconductor manufacturing apparatuses, for processing substrates such as semiconductor wafers or glass substrates, for example, the substrates are sequentially and circulatively conveyed to various processing units so that various processes such as surface treatment, for example, are performed to the substrates in these units.

As a substrate conveying mechanism used in such circulation conveyance type substrate conveying systems, there are a sequential conveyance type robot for conveying each substrate while gripping the same and a double-hand type robot having a two-level hand structure with upper and lower substrate holding portions. With this double-hand type conveying mechanism, each processing unit can be accessed by two hands sequentially, such that, in each processing unit, high-speed processing can be done while interchanging substrates such as wafers.

Generally, a substrate conveying system has a substrate holding means provided at a free end of a robot arm. The robot arm can be moved rotationally, extended or contracted horizontally and moved vertically, to perform transfer of a substrate between it and a processing unit. Also, there are cases wherein the robot itself is made rotationally movable and also movable horizontally or vertically.

These motions are controlled in accordance with axes (drive axes) corresponding to the motions, respectively. Namely, there are an axis for rotational motion, an axis for horizontal motion and an axis for vertical motion, for example.

As regards operation commands to such a conveyance robot, generally, a distance from a mechanical origin is taught to each axis defined in the robot in the form of a coordinate value (teaching position). Each value is stored in a memory of the robot. A host controller then specifies, with reference to the thus stored positions, a substrate transfer operation or any other independent operations related to respective axes.

In conventional conveying systems such as described above, only a single operation speed is set with respect to each driving axis of the robot. As a result, when the;conveyance robot conveys a substrate into a processing unit, a high-speed collision may occur between the substrate and the processing unit. The impact of collision may cause vibration of the substrate in the processing unit, as the same is loaded into the processing unit, and accurate processing may be interrupted. On the other hand, when the conveyance robot takes the substrate out of the processing unit, there may occur a high-speed collision between the substrate and the conveyance robot. The impact of collision may disturb accurate conveyance.

Recently, the wafer size becomes larger and thus the wafer weight becomes heavier. This makes the impact of collision between a substrate and a processing unit or between a substrate and a conveyance robot quite larger, and the influence thereof becomes critical.

On the other hand, conventional substrate conveying robot systems use substrate holding methods such as of a vacuum finger type wherein a substrate is attracted by vacuum, a fit-in type wherein a substrate is fitted in a recessed portion and held thereby, or a mechanical grip type (Japanese Laid-Open Patent Application, Laid-Open No. 22502/1995) wherein a free-end side gripping portion is moved toward an arm grip of arcuate shape so that a substrate is sandwiched between them.

However, these conventional substrate holding methods involve problems of contamination or deformation of a substrate, for example. While details will be discussed later in this specification (specifically, in relation to a third embodiment), there is a possibility that particles produced at a mechanical sliding portion of a conveyance robot or a friction portion between a substrate and a substrate holding element of the conveyance robot are adhered to the substrate, to cause contamination of the same. Also, there is a possibility that a temperature difference is created between a top face side of a substrate and a bottom face side thereof as held by a robot arm of the conveyance robot, which may cause warp of the substrate or a crack in the substrate.

SUMMARY OF THE INVENTION

It is accordingly an object of the present invention to provide a substrate conveying system and/or a substrate conveying method, by which high-speed collision of a substrate during transportation of the substrate by a conveyance robot or the like can be avoided.

It is another object of the present invention to provide a substrate conveying hand mechanism by which contamination of a substrate by particles and/or deformation of the substrate due to a temperature difference can be avoided.

In accordance with an aspect of the present invention, there is provided a substrate conveying system, comprising: a robot arm with substrate holding means for holding a substrate, said robot arm being operable to move said substrate holding means to a predetermined position to enable transfer of the substrate; and control means for controlling movement of said substrate holding means to said predetermined position, said control means having at least one axis and being operable to control the movement of said substrate holding means related to said at least one axis, with respect to at least four, first to fourth, positions, wherein the first position is a movement start position where the movement of said substrate holding means is to be started, wherein the second position is a first speed changing position where a movement speed of said substrate holding means is to be changed from a first set speed to a second set speed, wherein the third position is a second speed changing position where the movement speed of said substrate holding means is to be changed from the second set speed to the first set speed, and wherein the fourth position is a movement completion position where the movement of said substrate holding means is to be completed.

The transfer of the substrate may be performed during movement of said substrate holding means from the first speed changing position to the second speed changing position.

The second set speed may be slower than the first set speed.

The substrate holding means may include a holding mechanism for mechanically holding the substrate.

In accordance with another aspect of the present invention, there is provided a substrate conveying method, comprising the steps of: holding a substrate through a substrate holding device provided on a robot arm; and moving the substrate holding device to a predetermined position in accordance with at least one axis, for transfer of the substrate; wherein said moving step for moving the substrate holding means device in accordance with the at least one axis includes (i) moving, at a first set speed, the substrate holding device to a movement start position where the movement of the substrate holding device is to be started, (ii) moving, at the first set speed, the substrate holding device to a first speed changing position where a movement speed of the substrate holding device is to be changed from the first set speed to a second set speed, (iii) moving, at the second set speed, the substrate holding device to a second speed changing position where the movement speed of the substrate holding device is to be changed from the second set speed to the first set speed, and (iv) moving, at the first set speed, the substrate holding device to a movement completion position where the movement of the substrate holding device is to be completed.

The transfer of the substrate may be performed during movement, at the second set speed, of the substrate holding device from the first speed changing position to the second speed changing position.

The second set speed may be slower than the first set speed.

The substrate holding device may include a holding mechanism for mechanically holding the substrate.

In accordance with a further aspect of the present invention, there is provided a substrate conveying system, comprising: a robot arm with substrate holding means for holding a substrate, said robot arm being operable to move said substrate holding means to a predetermined position to enable transfer of the substrate; and control means for controlling movement of said substrate holding means to said predetermined position, said control means having at least two axes and being operable to control the movement of said substrate holding means related to said at least two axes, with respect to at least seven, first to seventh, positions, wherein the first position is a movement start position for a first axis where the movement of said substrate holding means with respect to the first axis is to be started, wherein the second position is a movement start position for a second axis where the movement of said substrate holding means with respect to the second axis is to be started, wherein the third position is a first speed changing position for the second axis where a movement speed of said substrate holding means with respect to the second axis is to be changed from a first set speed for the second axis to a second set speed for the second axis, wherein the fourth position is a second speed changing position for the second axis where the movement speed of said substrate holding means with respect to the second axis is to be changed from the second set speed for the second axis to the first set speed for the second axis, wherein the fifth position is a second speed changing position for the first axis where the movement speed of said substrate holding means with respect to the first axis is to be changed from a second set speed for the first axis to a first set speed for the first axis, wherein the sixth position is a movement completion position for the first axis where the movement of said substrate holding means with respect to the first axis is to be completed, and wherein the seventh position is a movement completion position for the second axis where the movement of said substrate holding means with respect to the second axis is to be completed.

The transfer of the substrate may be performed during movement of said substrate holding means from the first speed changing position for the second axis to the second speed changing position for the second axis.

The second set speed for the second axis may be slower than the first set speed for the second axis, and the second set speed for the first axis may be slower than the first set speed for the first axis.

The substrate holding means may include a holding mechanism for mechanically holding the substrate.

In accordance with a yet further aspect of the present invention, there is provided a substrate conveying method, comprising the steps of: holding a substrate through a substrate holding device provided on a robot arm; and moving the substrate holding device to a predetermined position in accordance with at least two axes, to enable transfer of the substrate; wherein said moving step for moving the substrate holding device in accordance with at least two axes includes (i) moving, at a first set speed with respect to a first axis and also at a first set speed with respect to a second axis, the substrate holding device to a movement start position for the first axis where the movement of the substrate holding device with respect to the first axis is to be started, (ii) moving, at the first set speed with respect to the first axis, the substrate holding device to a movement start position for the second axis where the movement of the substrate holding device with respect to the second axis is to be started, (iii) moving, at the first set speed with respect to the second axis, the substrate holding device to a first speed changing position for the second axis where a movement speed of the substrate holding device is to be changed from the first set speed for the second axis to a second set speed for the second axis, (iv) moving, at the second set speed with respect to the second axis, the substrate holding device to a second speed changing position for the second axis where the movement speed of the substrate holding device is to be changed from the second set speed for the second axis to the first set speed for the second axis, (v) moving, at the first set speed with respect to the second axis, the substrate holding device to a movement completion position for the second axis where the movement of the substrate holding device with respect to the second axis is to be completed, (vi) moving, at the second set speed with respect to the first axis, the substrate holding device to a second speed changing position for the first axis where the movement speed of the substrate holding device is to be changed from a second set speed for the first axis to the first set speed for the first axis, and (vii) moving, at the first set speed with respect to the first axis, the substrate holding device to a movement completion position for the first axis where the movement of the substrate holding means with respect to the first axis is to be completed.

The transfer of the substrate may be performed during movement, at the second set speed with respect to the second axis, of the substrate holding device from the first speed changing position for the second axis to the second speed changing position for the second axis.

The second set speed for the second axis may be slower than the first set speed for the second axis, and the second set speed for the first axis may be slower than the first set speed for the first axis.

The substrate holding device may include a holding mechanism for mechanically holding the substrate.

In accordance with a yet further aspect of the present invention, there is provided a substrate conveying hand mechanism, comprising: fixed pawls provided at least at two locations; at least one movable pawl movably disposed with a variable distance to said fixed pawls, for sandwiching and holding a substrate between the same and said fixed pawls; and bellows means connected to said at least one movable pawl and being able to be expanded and contracted through actuation of a fluid, to change the distance between said at least one movable pawl and said fixed pawls.

The at least one movable pawl may include a pair of parallel arms each being swingably supported, and a tension spring for applying a tension urging force between said parallel arms, wherein a substrate can be held between said parallel arms as they are opened against the tension spring.

The at least one movable pawl may include an engagement adapted to be in roll engagement with a substrate when the same is held.

The substrate conveying system may further comprise an opening formed in a face to be opposed to the substrate, for releasing heat from the substrate as the same is held.

In accordance with a still further aspect of the present invention, there is provided a substrate conveying method, comprising the steps of: holding a substrate through a substrate holding device provided on a robot arm; and moving the substrate holding device in accordance with at least one axis, to a predetermined position, for transfer of the substrate; wherein said substrate holding device satisfies a relation with respect to said at least one axis that a position of said substrate holding device for receiving the substrate differs from a position of said substrate holding device for sending the substrate therefrom.

In accordance with a yet further aspect of the present invention, there is provided a semiconductor manufacturing apparatus including a substrate conveying system such as described above.

In accordance with a yet further aspect of the present invention, there is provided a semiconductor manufacturing apparatus including a substrate conveying hand mechanism as recited above.

In accordance with a still further aspect of the present invention, there is provided a semiconductor device manufacturing method including a step for processing a substrate conveyed in accordance with a substrate conveying method as recited above.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of the present invention will now be described with reference to the accompanying drawings.

[First Embodiment]

Figure 1:
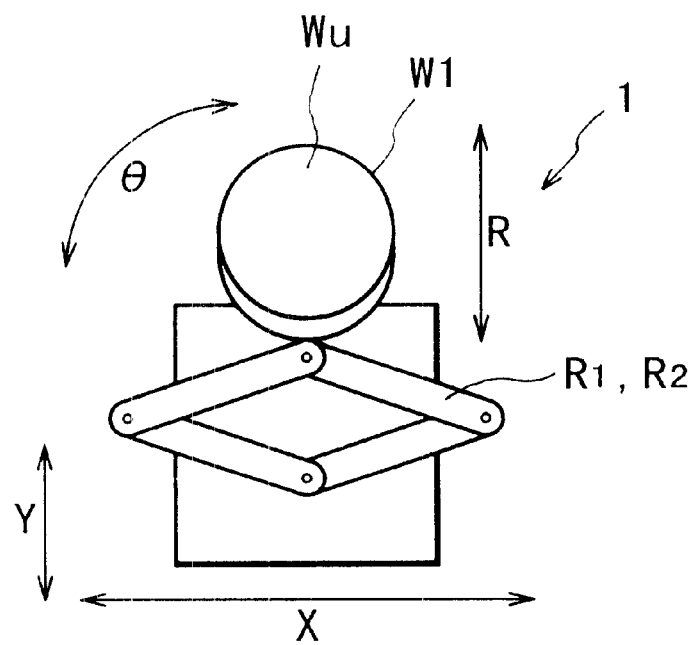
FIG. 1 is a top plan view of an example of a conveyance robot usable in the present invention.
Figure 2:
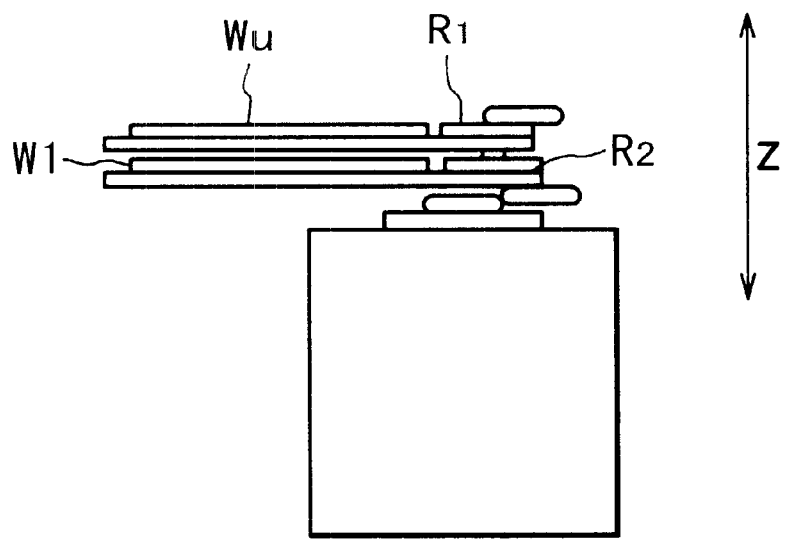
FIG. 2 is a side view of an example of a conveyance robot usable in the present invention.

FIG. 1 is a top plan view of a double-hand type robot having two substrate holding portions (upper and lower hands) arrayed vertically. FIG. 2 is a side view thereof.

As shown in FIG. 1, the robot 1 includes two, upper and lower robot arms each having a substrate holding means at a free end thereof (in the illustrated example, there are substrates $W_u$ and $W_1$ held thereby), and the robot has an axis (θ axis) for rotational motion (θ) and an axis (R axis) for forward/backward motion (R). In the illustrated example, the mechanisms for performing forward/backward motions of the robot arms comprise arm-like link mechanism $R_1$ and $R_2$. There are additional axes for moving the robot 1 as a whole in a lateral direction (X axis) and a longitudinal direction (Y axis). Further, as shown in FIG. 2, the robot 1 has an axis (Z axis) for moving its arms in its height direction (Z direction). As best shown in FIG. 2, this robot 1 is arranged so that two substrates $W_u$ and $W_1$ are simultaneously held by the upper and lower substrate holding means, respectively.

Figure 3:
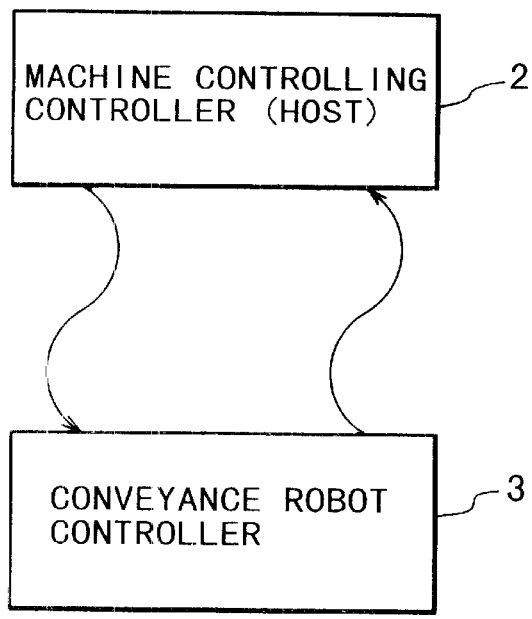
FIG. 3 is a diagram for explaining an example of a control system for a conveyance robot, usable in the present invention.

This conveyance robot 1 is connected to a control system such as shown in FIG. 3, for example. More specifically, in response to a communication command or an electric signal from a machine controlling controller (HOST) 2, a conveyance robot controller 3 for practically controlling the operation of the conveyance robot 1 is actuated, such that, while sequentially conveying substrates in an order as scheduled by the machine controlling controller (HOST) 2, they are circulated through predetermined processing units to be processed thereby.

As regards operation commands to this conveyance robot 1, a distance from a mechanical origin is taught to each axis defined in the robot in the form of a coordinate value (teaching position). Each value is stored in a memory, in the conveyance robot controller 3, such as a non-volatile storing device, for example. The machine controlling controller (HOST) 2 then specifies, with reference to the thus stored positions, a substrate transfer operation or any other independent operations related to respective axes.

Figure 4:
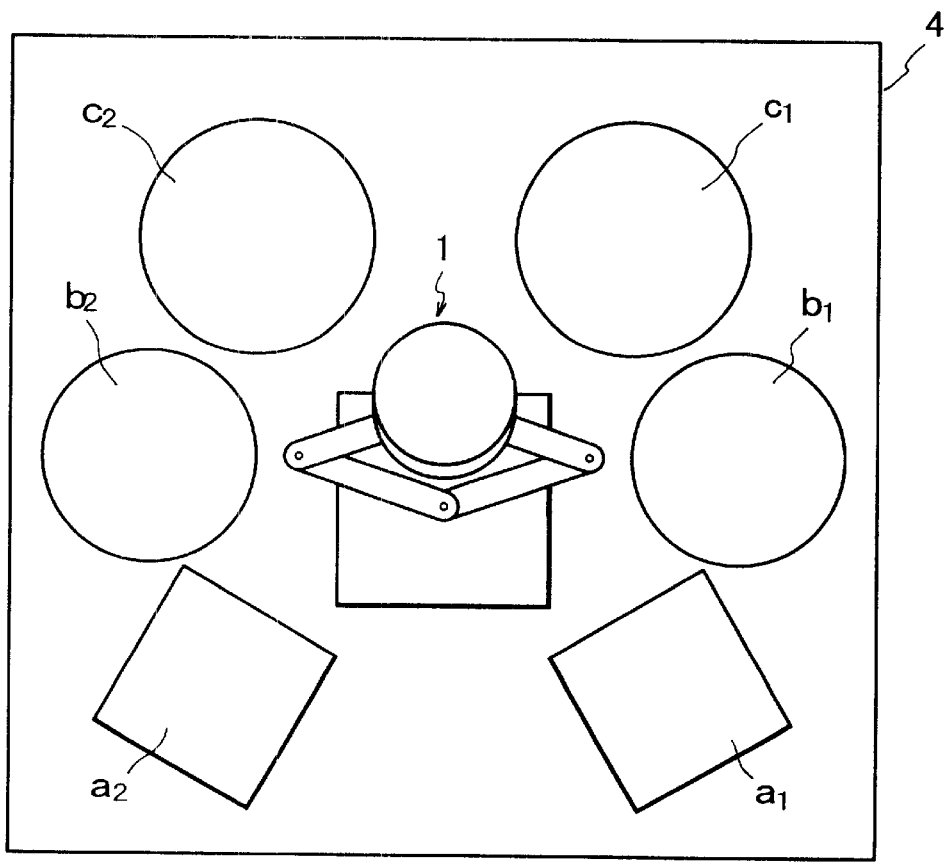
FIG. 4 is a schematic view of a general structure of an ashing processing system according to an embodiment of the present invention.

FIG. 4 shows an example of a substrate processing system having such a substrate conveyance robot 1 incorporated therein, and illustrates the structure of an ashing processing system for a photosensitive resin (photoresist) to be used in semiconductor manufacturing processes.

In semiconductor manufacturing processes, usually, a photosensitive resin is applied, by using a coating machine, onto a film to be processed, which is formed on the surface of a substrate such as a silicon wafer, for example. To this photosensitive resin, a pattern of a mask (reticle) having been prepared beforehand is lithographically transferred by use of an exposure apparatus. Thereafter, a developing process is performed to it by use of a developing apparatus, by which a desired transferred pattern of photosensitive resin is produced. Then, by using this transferred pattern as a mask, an etching process, a diffusion process and a film forming process, and the like, are performed. After completion of all the required processes, the pattern of photosensitive resin having been used as a mask is ashed by using ozones produced by plasma and, by cleaning, it is removed.

As shown in FIG. 4, the ashing processing system 4 includes substrate containing cassettes $a_1$ and $a_2$ for supplying and collecting substrates, ashing processing chambers $c_1$ and $c_2$, and cooling plates $b_1$ and $b_2$ for cooling the substrates. There are plural identical units, and this is to enable simultaneous and parallel execution of the same processings to thereby improve the throughput. Conveyance of substrates to these units is performed by use of the conveyance robot 1 disposed at the center of the processing system.

Figure 5:
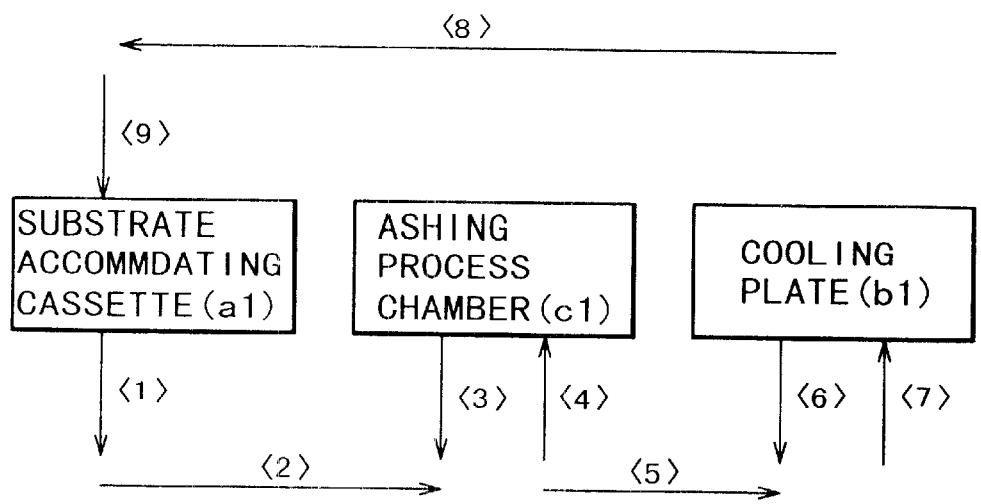
FIG. 5 is a diagram for explaining a conveyance turn in the ashing processing system of FIG. 4.

The substrate conveyance may be performed in accordance with the sequence such as shown in FIG. 5, for example. More specifically, first, a substrate is taken out of the container cassette $a_1$ (step <1>). It is conveyed to the ashing processing chamber $c_1$ (step <2>). In this ashing processing chamber $c_1$, first, a substrate having been processed is taken out (step <3>) and, then, the substrate conveyed thereto is loaded (step <4>). The substrate taken out of the ashing processing chamber $c_1$ is conveyed to the cooling plate $b_1$ (step <5>). Also, at this cooling plate $b_1$, a substrate having been cooled is taken out (step <6>) and, then, the substrate conveyed thereto is loaded (step <7>). The substrate taken out of the cooling plate $b_1$ is conveyed to the container cassette $a_1$ (step <8>), and it is stored into the cassette $a_1$ (step <9>).

Figure 6:
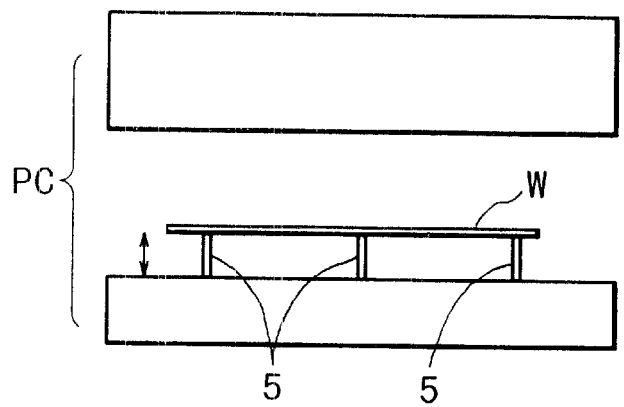
FIG. 6 is a side view of an example of a substrate supporting mechanism of a process unit, used in the ashing processing system of FIG. 4.

The ashing processing chambers $c_1$ and $c_2$ for performing an ashing process to substrates may include a process unit PC such as shown in FIG. 6. Here, denoted at 5 are supporting pins being movable upwardly and downwardly, and being for use in receiving a substrate W. These supporting pins 5 move upwardly for transfer of a substrate, and they are provided at positions not mechanically interfering with the transfer operation of the conveyance robot. Also, they are moved downwardly for execution of the substrate processing, to enable that the substrate processing is performed at the position appropriate for the substrate processing condition.

Figure 7:
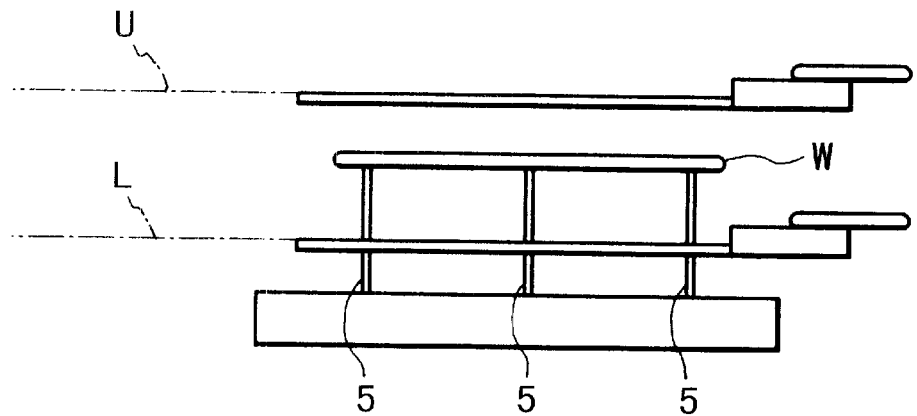
FIG. 7 is a schematic view for explaining an example of a teaching position with respect to a Z-axis direction.

For transfer of a substrate to and from these supporting pins 5 of the process unit, conventionally, it is done by specifying two position coordinates of an upper position (U) and a lower position (L) with respect to the Z-axis teaching, as shown in FIG. 7.

The operation for placing a substrate on these supporting pins in the conventional system will first be explained with reference to FIGS. 8 and 9.

Figure 8:
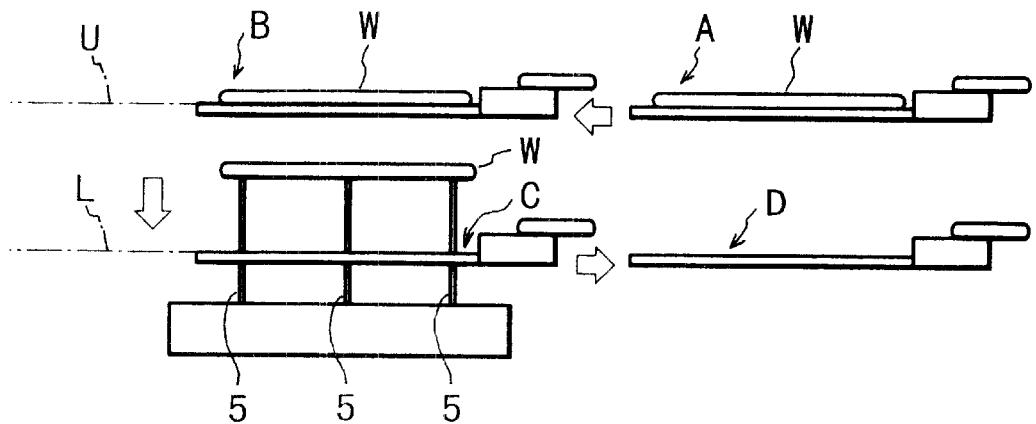
FIG. 8 is a schematic view for explaining an operation for taking a substrate out of a unit.
Figure 9:
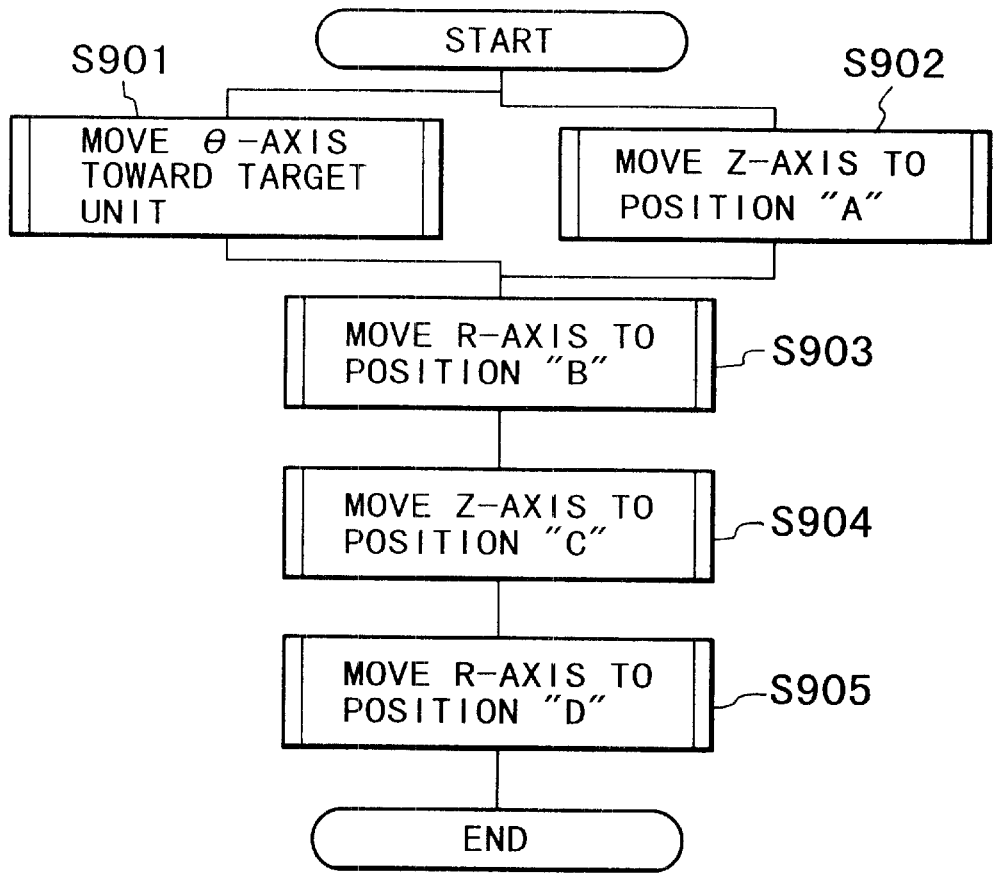
FIG. 9 is a flow chart for explaining a control procedure of the operation shown in FIG. 8.

First, the θ axis (FIG. 1) and the Z axis (FIG. 2) are actuated so that the robot arm is moved to a position A at the upper side (U) in FIG. 8 (steps S901 and S902 in FIG. 9). Subsequently, the R axis is actuated to move the robot arm forward, up to a position B at the upper side (U) in FIG. 8 (step S903 in FIG. 9). Then, the Z axis is actuated to move the robot arm downwardly, to a position C at the lower side (L) in FIG. 8 (step S904 in FIG. 9). In the course of this downward motion, the substrate W is placed on the supporting pins 5. Thereafter, the R axis is actuated to retract the robot arm, to a position D at the lower side (L) in FIG. 8 (step S905 in FIG. 9).

Next, the operation for picking up a substrate from the supporting pins 5 will be explained with reference to FIGS. 10 and 11.

Figure 10:
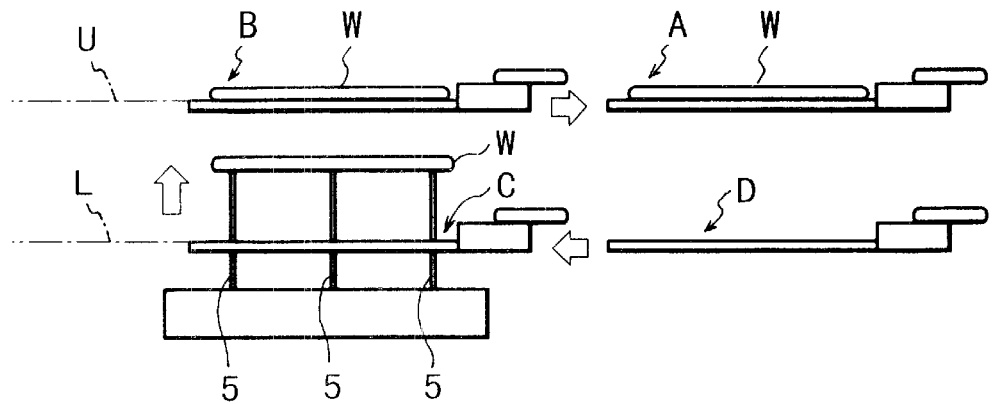
FIG. 10 is a schematic view for explaining an operation for loading a substrate into a unit.
Figure 11:
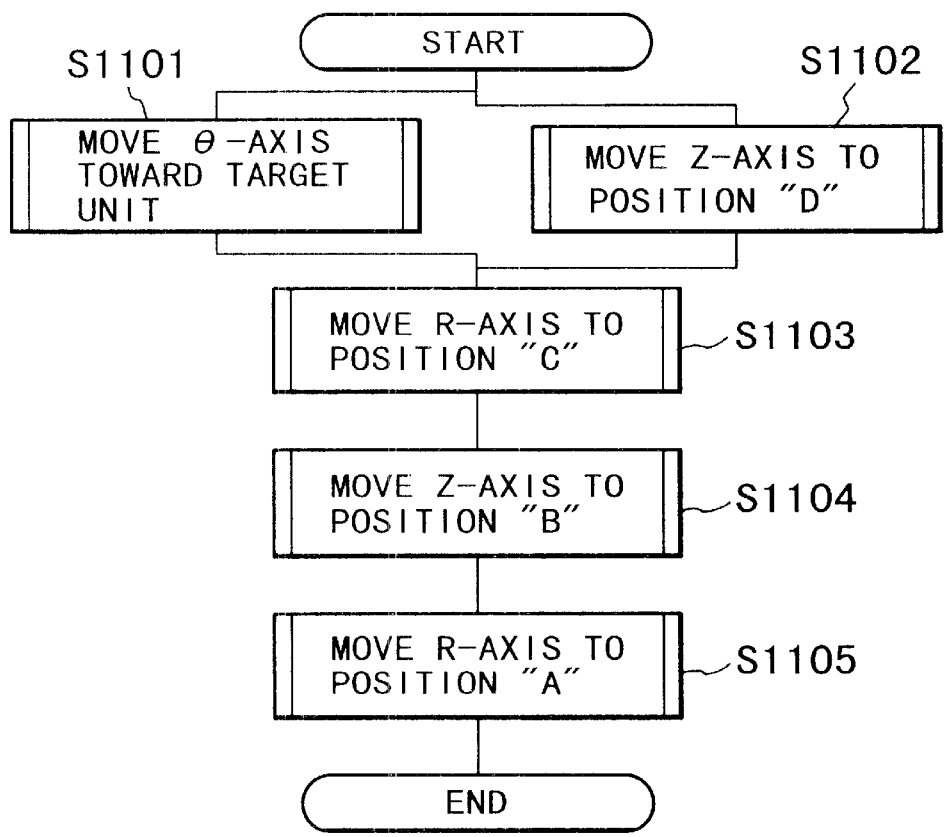
FIG. 11 is a flow chart for explaining a control procedure of the operation shown in FIG. 10.

First, the θ axis and Z axis are actuated to move the robot arm to a position D at the lower side (L) in FIG. 10 (steps S1101 and S1102 in FIG. 11). Subsequently, the R axis is actuated to move the robot arm forward, to a position D at the lower side (L) in FIG. 10 (step S1103 in FIG. 11). Thereafter, the Z axis is actuated to move the robot arm upwardly to a position B at the upper side (U) of FIG. 10 (step S1104 in FIG. 11). In the course of this upward motion, the substrate W is transferred from the supporting pins 5 to the robot arm. Thereafter, the R axis is actuated to retract the robot arm, to a position A at the upper side (U) in FIG. 10 (step S1105 in FIG. 11).

These operations are made in accordance with a common operation speed, a common acceleration, a common S-shaped driving parameter, and the like, all being set in common with regard to all the axes prepared for the conveyance robot 1. Therefore, these operations are made surely at the same speed.

As regards the method of specifying these operations to the conveyance robot controller 3 from the machine controlling controller (HOST) 2, a sequential control flow such as shown in FIG. 9 or 11 is executed in response to a single operation command.

Figure 14A:
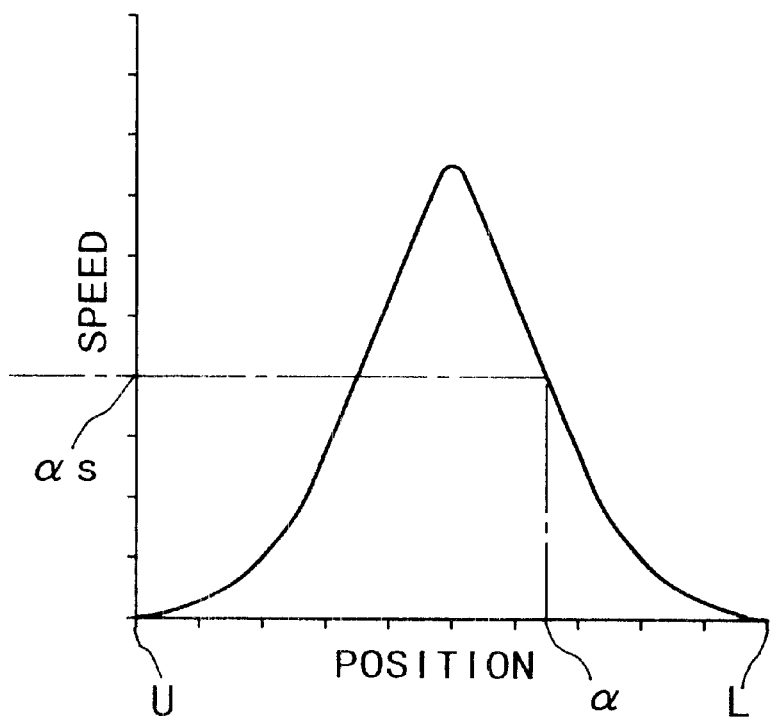
FIGS. 14A and 14B are graphs, respectively, for explaining the relation between an operation speed and an operation time (position), in a conventional control operation method.
Figure 14B:
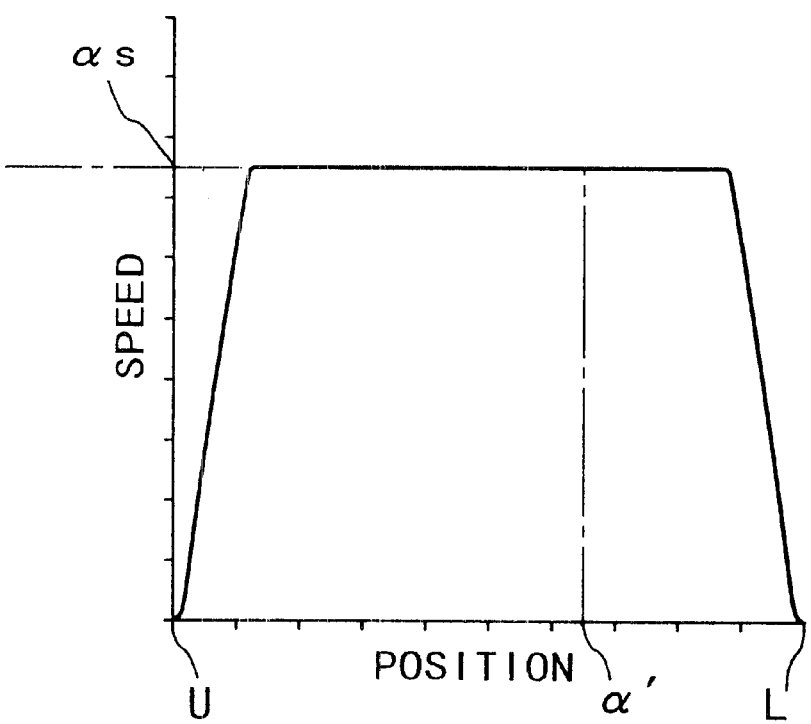

FIGS. 14A and 14B show the relation between the operation speed in the Z axis and the operation time (position) to be established when these operations are made. In FIGS.

14A and 14B, the axis of abscissa denotes the operation time (position) and the axis of ordinate corresponds to the operation speed. Also, the origin of the graph is taken on the upper side (U), and the operation toward the lower side (L) from this position is plotted in the graph.

Here, if the position of a supporting pin as the same receives a substrate is α, then the collision speed of the substrate and the supporting pin at that moment is αs. This speed αs is variable in dependence upon the teaching positions U and L as well as the actual operation speed between them. For example, FIG. 14A corresponds to a case where the interval between U and L is relatively narrow as compared with the set speed, and, in this example, the operation speed starts its deceleration without reaching the set speed (or instantaneously thereafter even it is reached). On the other hand, FIG. 14B shows a case where the interval between U and L is relatively wide, and, in this example, the operation speed reaches the set speed and, after a constant-speed state is continued for a certain time, deceleration starts.

In any of these cases, the substrate and the supporting pin collide with each other at a relatively high speed. As a result, due to its impact, vibration of the substrate is generated upon the supporting pins when the substrate is loaded into a processing unit. This disturbs accurate processing of the substrate in the unit.

When, on the other hand, the robot arm receives a substrate from the supporting pins, in this turn, the substrate and the robot arm collide with each other at a relatively high speed. This disturbs precise substrate conveyance.

Figure 13:
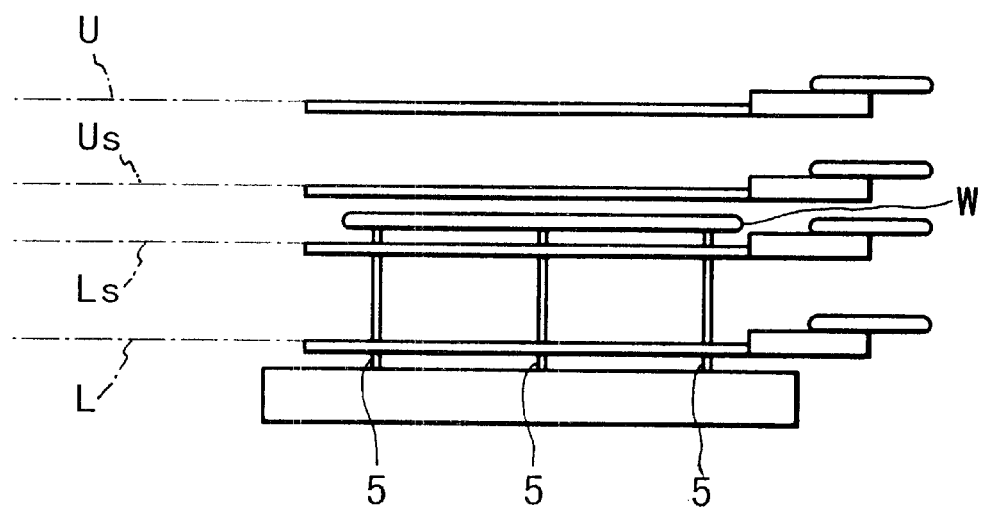
FIG. 13 is a schematic view for explaining an example of a teaching position, for accomplishing a substrate transfer operation with variation in speed in a Z-axis direction, according to a first embodiment of the present invention.

In accordance with a preferred embodiment of the present invention, in consideration of the above, as shown in FIG. 13, for example, two points $U_s$ and $L_s$ are newly added between the upper side (U) position and the lower side (L) position, for a lower-speed operation as compared with the normal speed. Also, as for the Z-axis operation speed, an operation speed $S_s$ lower than the normal or steady state speed $S_n$, is newly set for the motion between the positions $U_s$ and $L_s$, separately from the normal operation speed $S_n$. The position teaching is performed on the basis of them.

Figure 15:
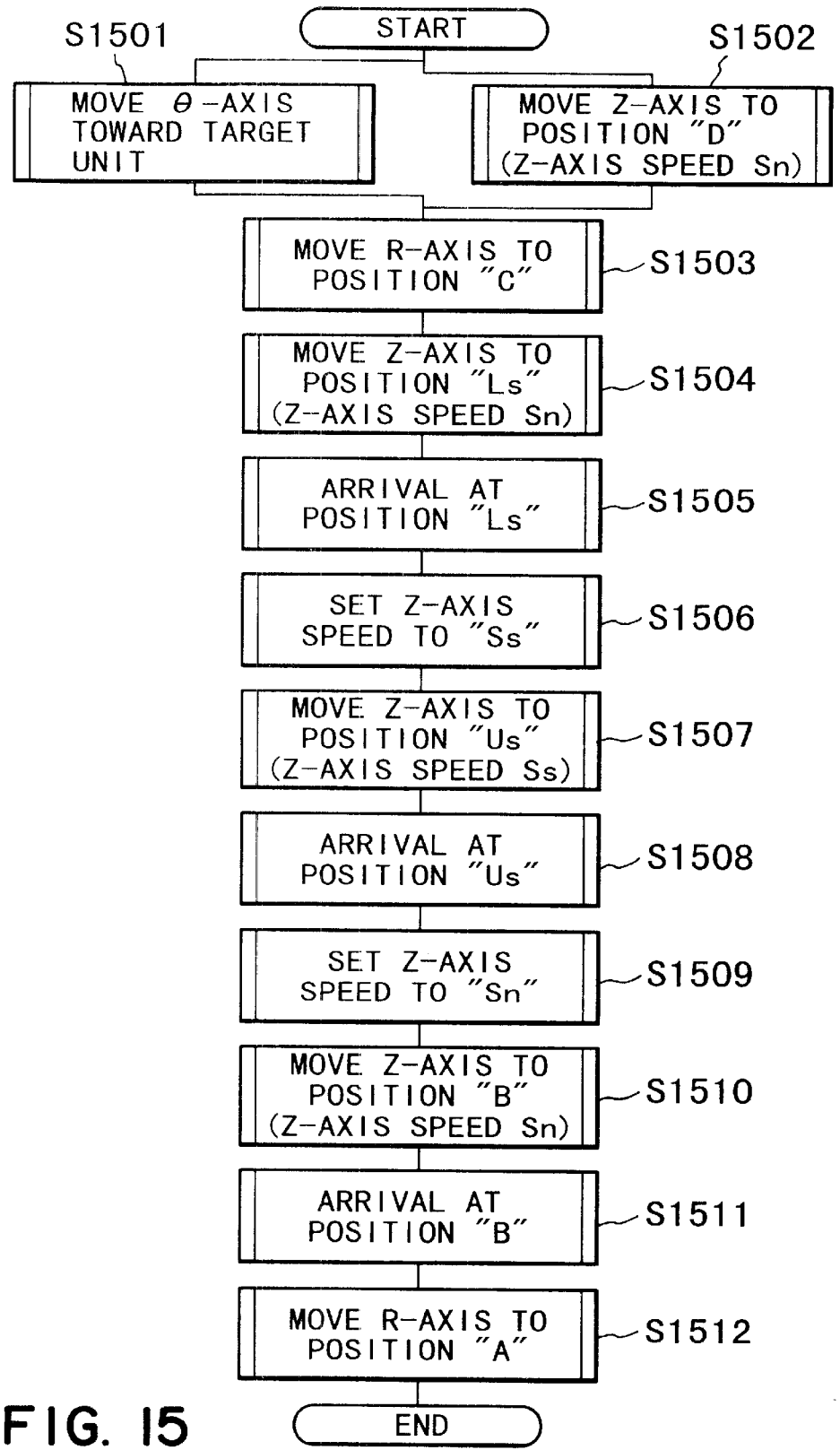
FIG. 15 is a flow chart for explaining a control procedure for Z-axis operation with variation in speed, according to the first embodiment of the present invention.
Figure 16:
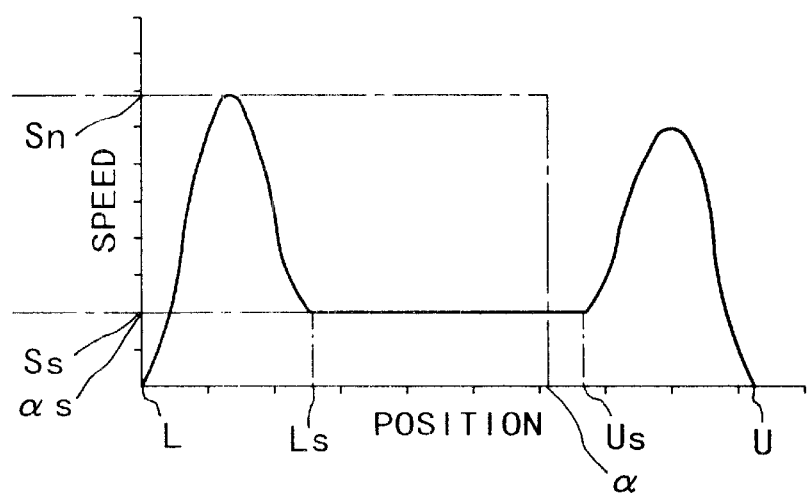
FIG. 16 is a graph for explaining the relation between an operation speed and an operation time (position), in the control operation method of FIG. 13.

FIG. 15 illustrates the operational sequence for conveying a substrate out of a processing unit, and FIG. 16 shows the relation between the operation speed and the operation time (position) in that sequence.

First, the θ axis and the Z axis are actuated, respectively, to move the robot arm to a position D at the lower side (L) in FIG. 10 (steps S1501 and S1502 in FIG. 15). Here, the Z axis is driven at a normal Z-axis speed $S_n$. Subsequently, the R axis is actuated to move the robot arm forwardly to a position C at the lower side (L) in FIG. 10, namely, to the lower side (L) position in FIG. 13 (step S1503 in FIG. 15). Thereafter, the Z axis is driven at the normal Z-axis speed $S_n$, to a position Ls in FIG. 13 (step S1504 in FIG. 15). As the robot arm reaches the position $L_s$ (step S1505 in FIG. 15), the set Z-axis speed is changed to $S_s$ (step S1506 in FIG. 15) and, while keeping this speed, the robot arm is moved toward the position $U_s$ (step S1507 in FIG. 15). In the course of this motion, a substrate W is transferred to the robot arm from the supporting pins 5. As the robot arm reaches the position $U_s$ (step S1508 in FIG. 15), the set Z-axis speed $S_s$ is changed back to $S_n$ (step S1509 in FIG. 15) and, while keeping this speed, the robot arm is moved to a position B at the upper side (U) in FIG. 10, namely, to the upper side (U) position in FIG. 13 (step S1510 in FIG. 15). As the robot arm reaches the position B (step S1511 in FIG. 15), the R axis is actuated to retract the robot arm, back to the position A at the upper side (U) in FIG. 10 (step S1512 in FIG. 15).

With this control, as shown in FIG. 16, the speed at the moment whereat the substrate and the robot arm contact with each other can be controlled to a desired low speed, and thus the impact of collision can be reduced significantly.

Similar control may be made when a substrate is to be loaded into a processing unit. The result is that the speed at the moment whereat the substrate and the supporting pins contact with each other can be controlled to a desired low speed, and consequently, the collision impact can be reduced significantly.

As described above, the driving speed of the robot arm is controlled to a lower speed only for the moment for substrate transfer, and, in the remaining period, the robot arm is driven at a normal speed. This enables desirable substrate transfer without considerable elongation of the entire operation time.

[Second embodiment]

Figure 12:
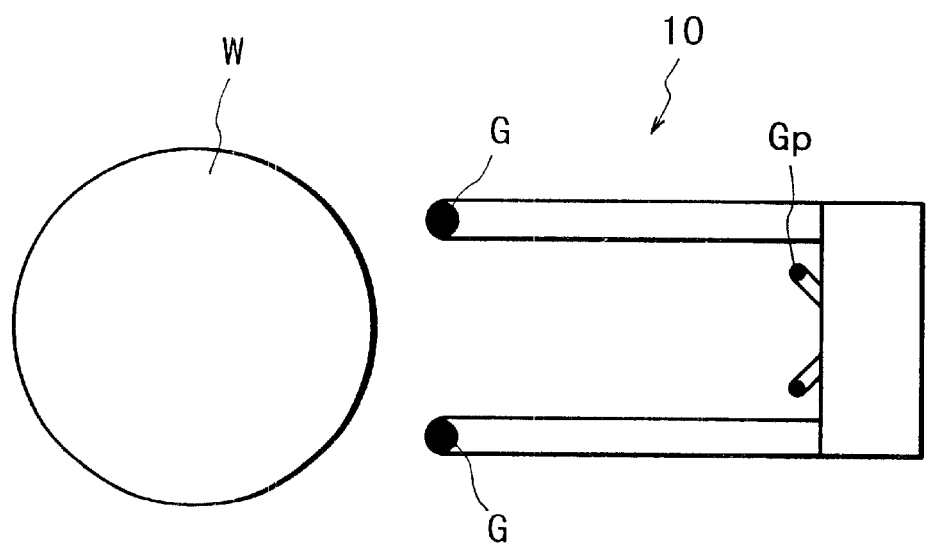
FIG. 12 is a schematic view of an example of a robot arm having a mechanism for mechanically holding a substrate.

The control procedure of the present invention when applied to a robot arm having a mechanical substrate holding mechanism such as shown in FIG. 12, will be explained.

As shown in FIG. 12, the robot arm 10 has a pair of fixed holding guides G and a pair of movable holding guides Gp, wherein a substrate W can be held thereby when sandwiched between them. More specifically, while a substrate W is sandwiched between them, the movable holding guides Gp relatively move toward the fixed holding guides G, by which the substrate W is gripped.

When a substrate is transferred to this robot arm 10 and is held thereby, if, for example, the spacing between juxtaposed upper and lower substrates being accommodated is narrow, as in the case of a substrate accommodating cassette, for example, the movable holding guides Gp can not be driven at the position where they receive a substrate. This means that, during a period from receiving the substrate to moving the movable holding guides Gp, the substrate is placed on the robot arm 10 for free motion. If therefore the driving speed of the robot arm 10 is large, there easily occurs positional shift of the substrate. Thus, accurate holding ends in failure.

Figure 17:
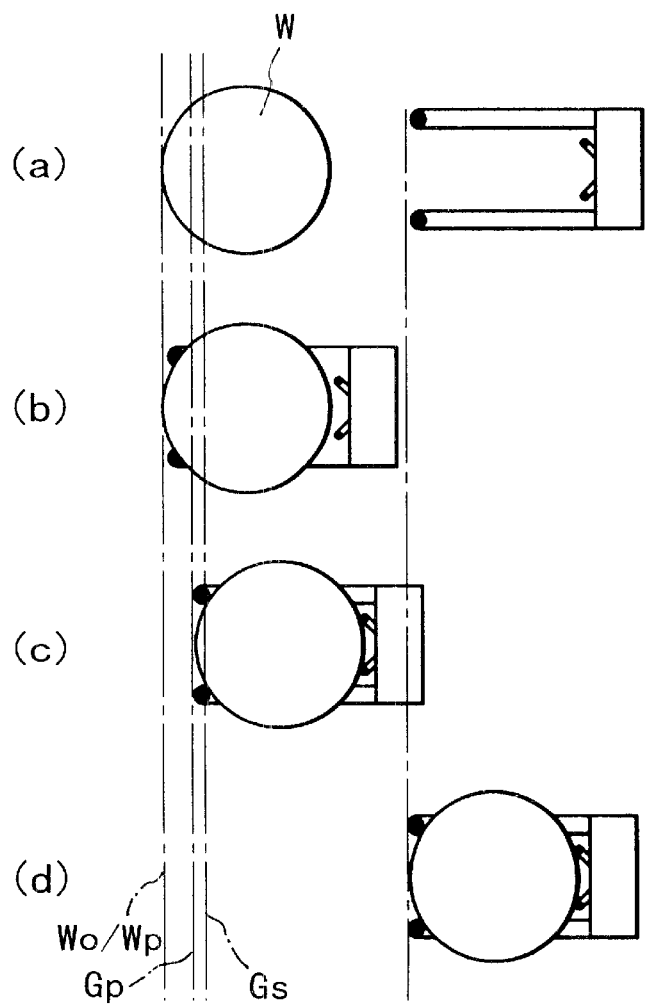
FIG. 17 is a schematic view for explaining an example of a teaching position for R-axis operation using a robot arm shown in FIG. 12, in a second embodiment of the present invention.

In this embodiment, in consideration of the above, as shown in FIG. 17, as for the driving speed of the robot arm 10 with respect to the R-axis direction, too, dual values of a normal speed $SG_n$ and a pre-gripping speed $SG_g$ lower than the former are set. Thus, as the teaching positions with respect to the R-axis direction, there are a substrate position W, a speed changing position $W_p$ for changing from $SG_n$ to $SG_g$, a holding guide driving position $G_p$, and a speed changing position (high-speed conveyance starting position) for changing from $SG_g$ to $SG_n$.

It should be noted that, in this example, the same coordinates are specified to the substrate position $W_o$ and the speed changing position $W_p$ (from $SG_n$ to $SG_g$). This is because of the following reason. In the R-axis operation, it is not effective to perform a similar speed changing control also in an operation period in which no substrate is being held. Thus, in relation to the substrate loading operation for moving the substrate from the robot arm 10 to the processing unit, the movement operation of the R-axis from the substrate position $W_o$ to the origin after the substrate is transferred, the R-axis operation is made at the normal speed $SG_n$. Similarly, in relation to the substrate unloading operation for moving the substrate from the processing unit side to the robot arm 10, the R-axis operation to the substrate position $W_o$ from the origin before the substrate is received, is made at the normal speed $SG_n$.

Figure 18A:
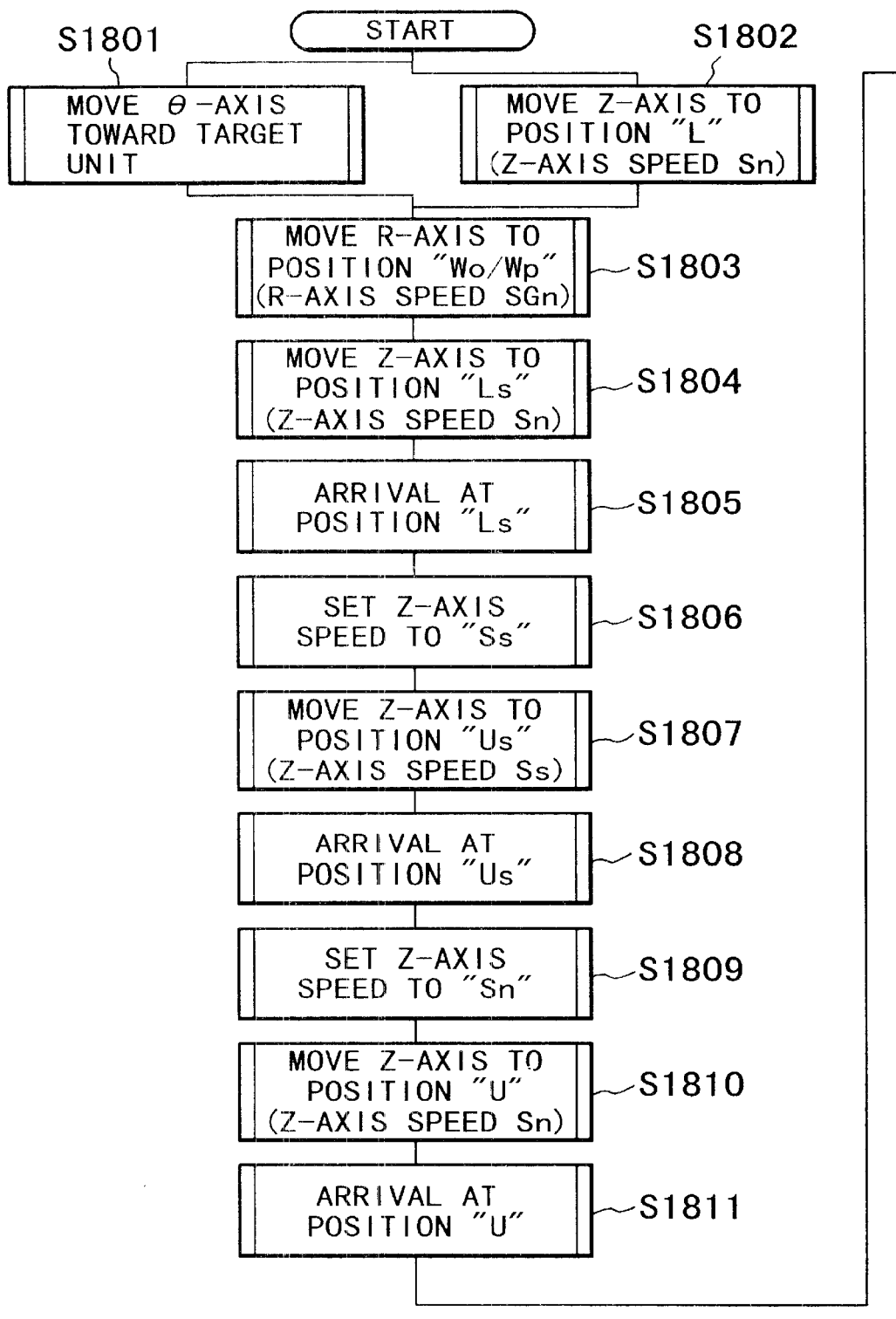
FIG. 18, comprising of FIGS. 18A and 18B is a flow chart for explaining a control procedure for the operation shown in FIG. 17.
Figure 18B:
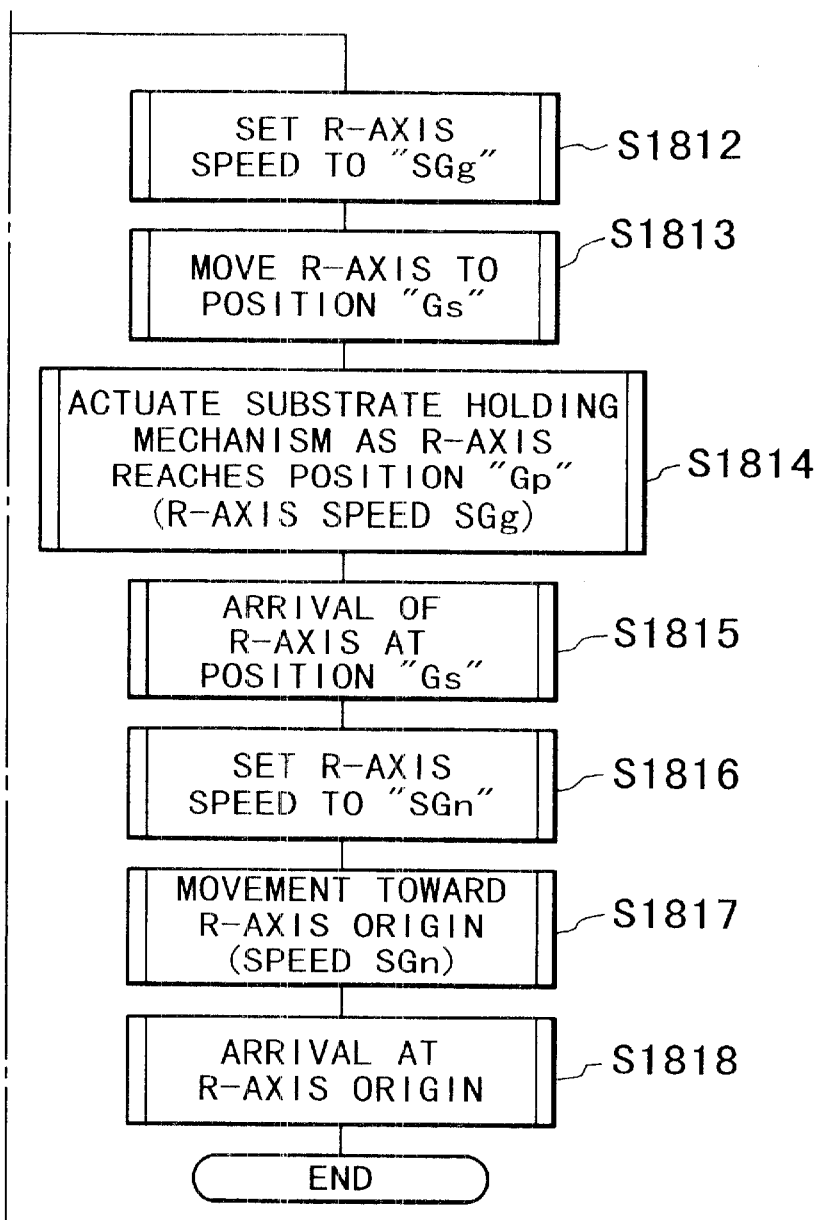
Figure 18:
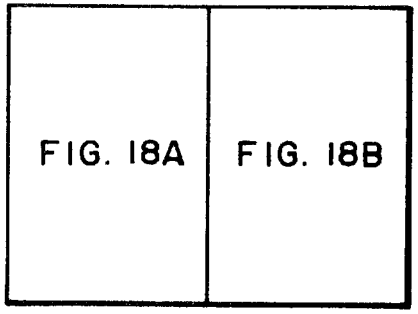

FIG. 18 shows the flow of operational control for the substrate unloading operation, moving a substrate from a processing unit side to the robot arm 10.

First, the θ axis and the Z axis are actuated respectively, to move the robot arm 10 to a lower side (L) position with respect to the Z axis, similar to that described hereinbefore, which is at a predetermined position close to a processing unit to be used (steps S1801 and S1802 in FIG. 18, or a stage (a) in FIG. 17). Here, the Z axis is driven at a normal Z-axis speed $S_n$. Subsequently, the R axis is driven at a normal speed $SG_n$, to move the robot 10 forwardly, to a substrate position $W_o/W_p$ (step S1803 in FIG. 18, or a stage (b) in FIG. 17). Thereafter the Z axis is driven at the normal Z-axis speed $S_n$, to a position $L_s$ (FIG. 13) (step S1804 in FIG. 18). As the robot arm 10 reaches the position $L_s$ (step S1805 in FIG. 18), the set Z-axis speed is changed to $S_s$ (step S1806 in FIG. 18). While keeping this speed, the robot arm 10 is moved toward the position $U_s$ (FIG. 13) (step S1807 in FIG. 18). In the course of this motion, the substrate W is transferred from the unit side to the robot arm 10. As the robot arm 10 reaches the position $U_s$ (step S1808 in FIG. 18), the set Z-axis speed $S_s$ is changed back to $S_n$ (step S1809 in FIG. 18). While keeping this speed, the robot arm 10 is moved to the upper side (U) position (FIG. 13) (step S1810 in FIG. 18). As the robot arm 10 reaches the position U (step S1811 in FIG. 18), the set speed of the R axis is changed from $SG_n$ to $SG_g$ (step S1812 in FIG. 18) and, thereafter, the robot arm 10 is retracted back to the position $G_s$ in FIG. 17 (step S1813 in FIG. 18). At the moment whereat, in the course of this motion, the robot arm 10 reaches the position $G_p$, the substrate holding mechanism of the robot arm 10 is actuated to grip the substrate, as shown at a stage (c) in FIG. 17 (step S1814 in FIG. 18). As the robot arm 10 reaches the position $G_s$ (step S1815 in FIG. 18), the set speed of the R axis is changed from $SG_g$ back to $SG_n$ (step S1816 in FIG. 18). While keeping this speed, the robot arm 10 is moved to the origin of the R axis (step S1817 in FIG. 18). When the robot arm 10 reaches the R-axis origin (step S1818 in FIG. 18), the process is completed (at a stage (d) in FIG. 17).

Figure 19:
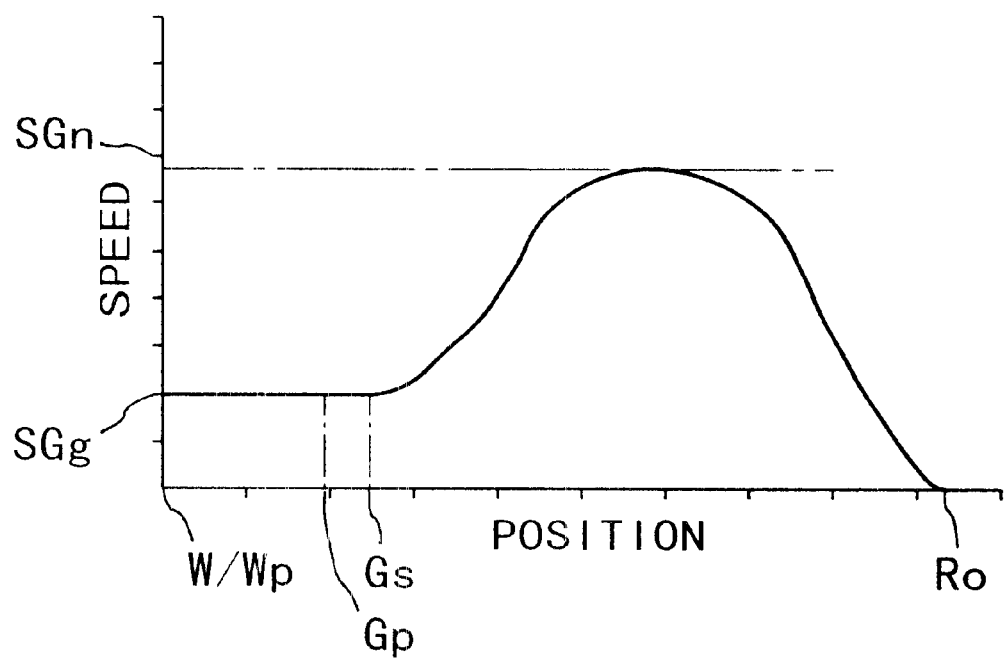
FIG. 19 is a graph for explaining the relation between an operation speed and an operation time (position), in the operation shown in FIG. 17.

FIG. 19 shows the relation between the operation speed and the operation time (position), in the movement of the robot arm 10 from the substrate position $W_o/W_p$ to the R-axis origin $R_o$ as controlled as described above. The axis of ordinate denotes the operation speed, and the axis of abscissa corresponds to the operation time (position).

In the operation control described above, the substrate position $W_o$ and the speed changing position $W_p$, changing from $SG_n$ to $SG_g$, are specified as the same coordinate position. Therefore, as the robot arm 10 receives the substrate, it promptly starts its operation at the lower speed $SG_g$. Since the operation start position $G_p$ of the substrate holding mechanism of the robot arm 10 is set before the high-speed conveyance start position $G_s$, the movement of the robot arm 10 in a state in which no substrate is held by the substrate holding mechanism of the robot arm 10 can be made at a lower speed, that is, $SG_g$. Therefore, any shift of the substrate in this state can be reduced significantly.

[Third Embodiment]

The substrate holding mechanism of the robot arm in the embodiments described above may comprise a mechanical holding mechanism such as shown in FIG. 12, or it may comprise a vacuum attraction system used prevalently. Hereinafter, a robot hand having a more preferable substrate holding mechanism will be described.

Wafer conveying systems in semiconductor manufacturing apparatuses are generally based on a vacuum finger type wherein a scalar shaped or straight shaped robot has a vacuum attracting portion of a thin plate-like shape formed on a free end of its arm, or a fit-in type wherein a wafer is fitted in a recessed portion and is conveyed thereby.

Recently, in an attempt to solve the problem of particles on the bottom face of a wafer and also to assure positioning of a wafer upon a hand, a proposal has been made in Japanese Laid-Open Patent Application, Laid-Open No. 22502/1995 to a handling system including an arm grip of arcuate shape and having a size slightly larger than a wafer outside diameter, as well as a free-end side grip being movable toward the arm grip.

In such vacuum type conveying systems, however, there is a problem of contamination of a wafer since, due to the vacuum attraction, particles are adhered to the bottom face of the wafer. Further, in a system to be used for a wafer process such as a resist removing system (ashing processing system), generally, the wafer is placed in a high temperature. If vacuum attraction is applied to the wafer in that state, the bottom face of the wafer is cooled quickly and it produces a difference in heat distribution between the top face and the bottom face of the wafer. This easily causes large warp of the wafer. This is an undesirable factor for generation of microcracks in the wafer. Further, any warp of the wafer causes failure of vacuum, and it deteriorates the stability of conveyance.

In the fit-in type, on the other hand, a largest margin for the size of the recessed portion will be only about 1 mm. If the margin is large, a wafer will move around within the hand. It means a difficulty in robot arm positioning, as the robot arm teaching is to be done. Also, in this system, there occurs a sliding contact between a wafer and a guide member therefor, during wafer positioning. This causes a problem of particle production due to the friction.

In the mechanical gripping system as proposed in aforementioned Japanese Laid-Open Patent Application, Laid-Open No. 22502/1995, the free-end grip moves slidingly. Thus, particles are produced, which causes contamination of a wafer. Further, it uses a sliding cylinder in a driving source, and, also in this respect, there is a problem of particle production.

Moreover, in conventional systems described above, where a high-temperature wafer as having been high-temperature processed by a processing system such as a resist removing apparatus is to be conveyed, because of a difference in thermal distribution between the top and bottom faces of the wafer, the wafer is deformed largely. This makes the conveyance very unstable. For this reason, it is necessary to delay the start of wafer conveyance until the wafer temperature decreases and the warp is stabilized. This is a large loss of time, and the throughput of the manufacturing system as a whole is lowered considerably.

This embodiment uses a robot hand of the structure to be described below, to avoid these inconveniences.

Figure 20:
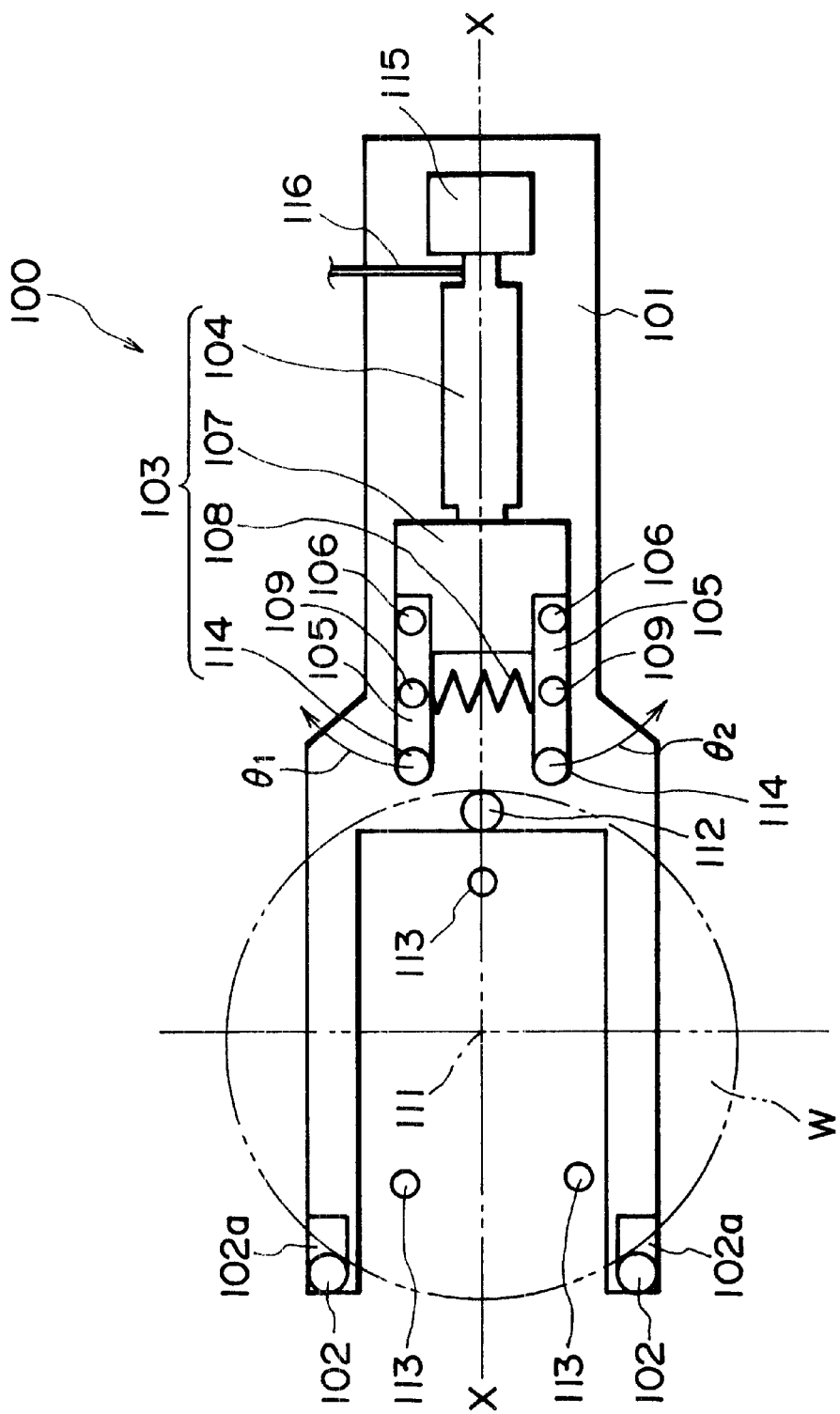
FIG. 20 is a top plan view of an example of a hand mechanism in a third embodiment of the present invention.
Figure 21:
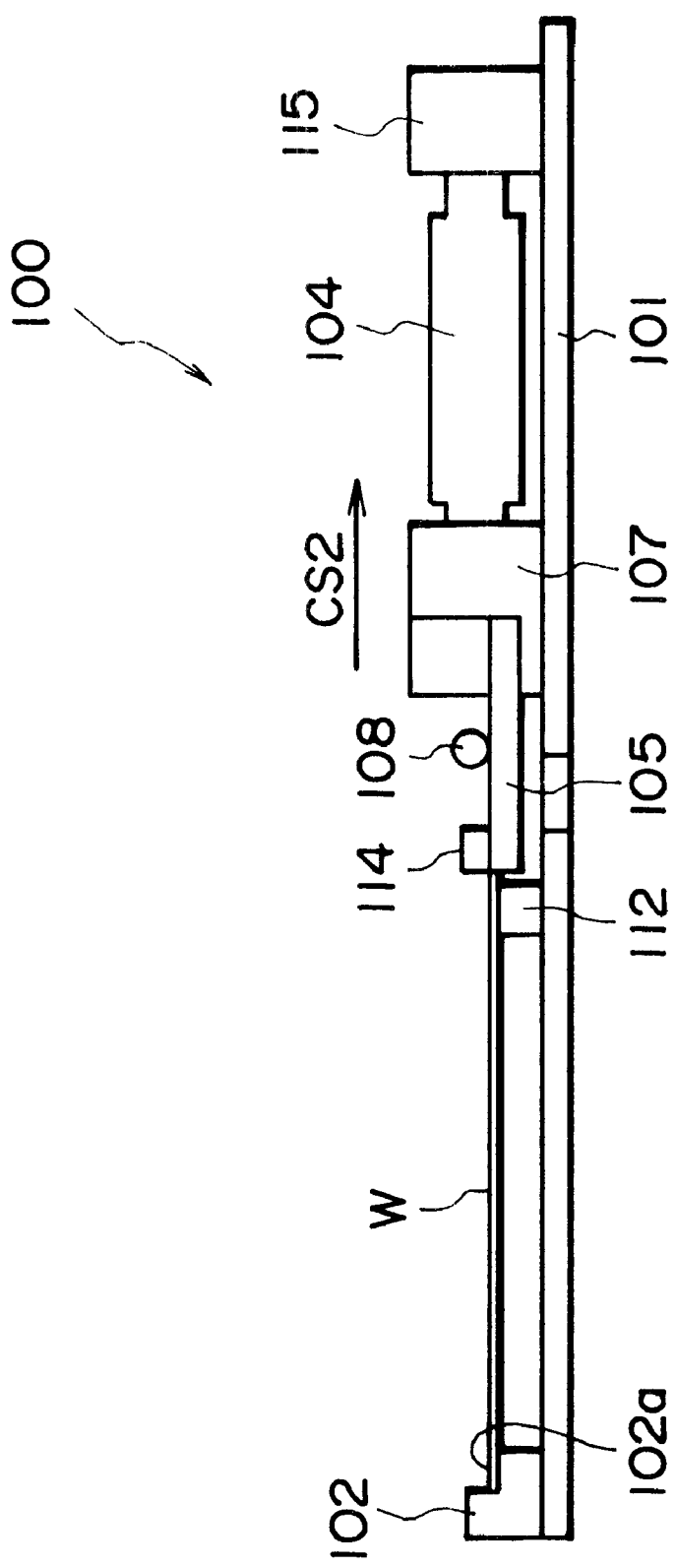
FIG. 21 is a side view of the hand mechanism of FIG. 20.
Figure 22:
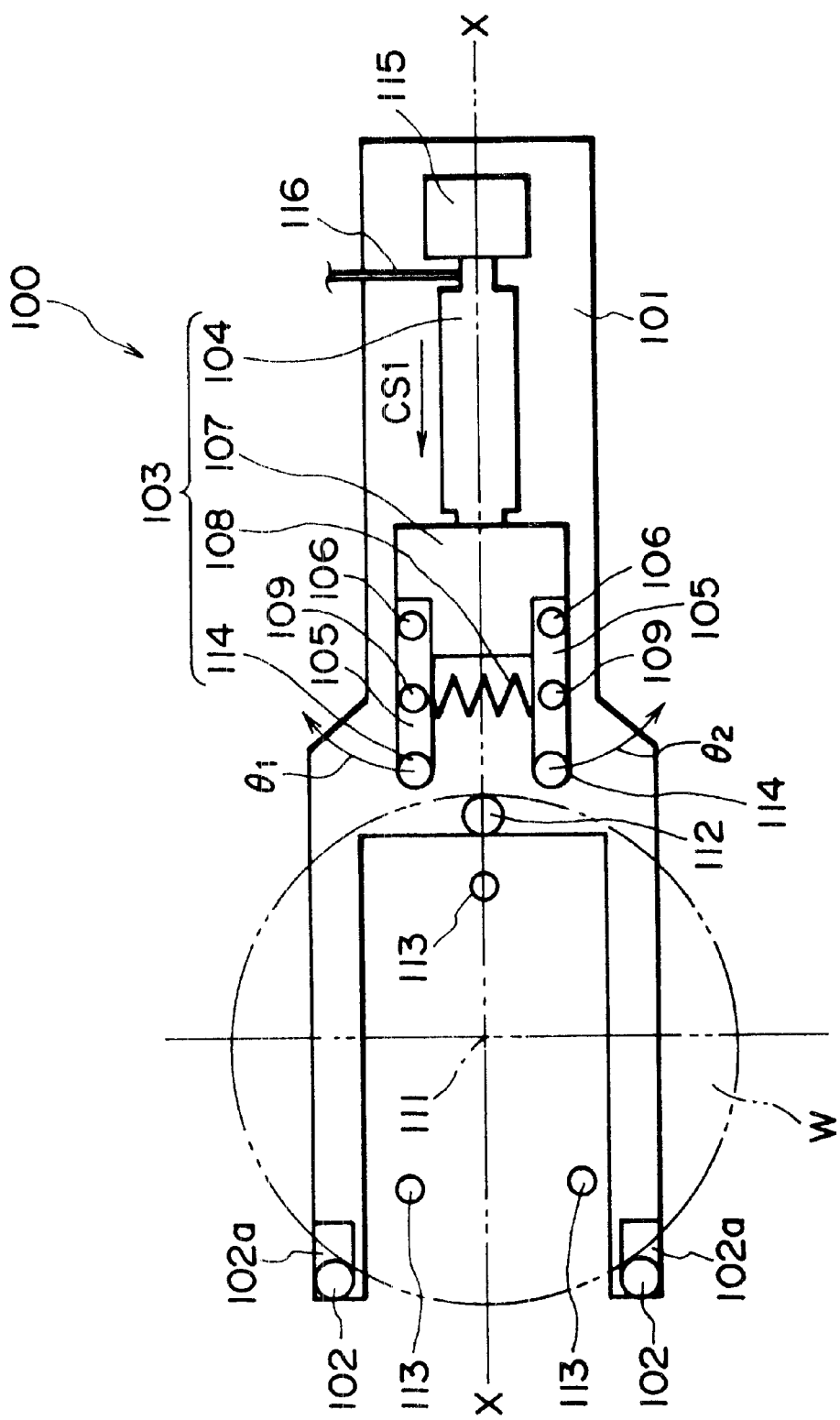
FIG. 22 is a top plan view of the hand mechanism of FIG. 20, in a gripping position thereof.
Figure 23:
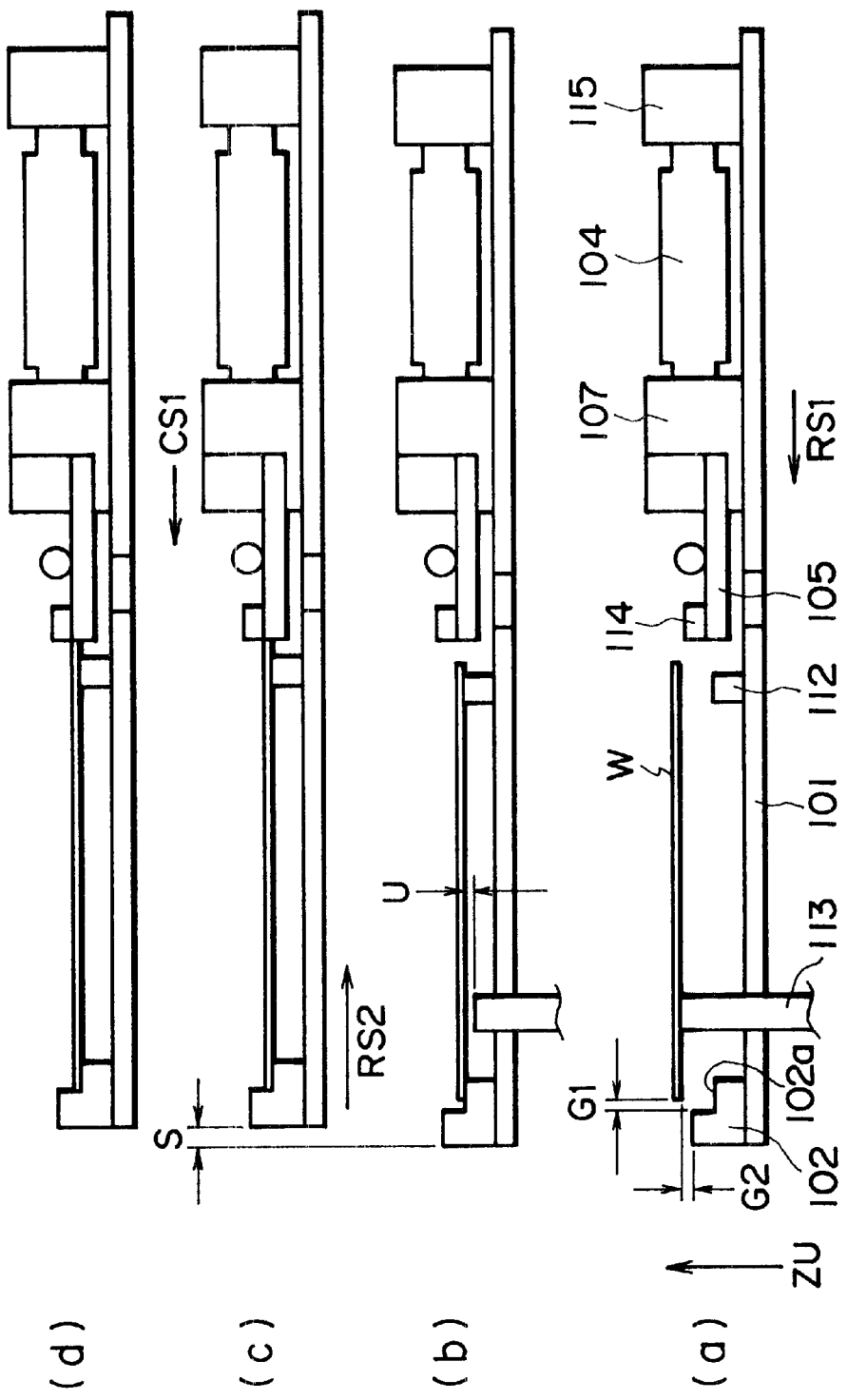
FIG. 23 is a schematic view for explaining a receiving operation of the hand mechanism of FIG. 20.
Figure 24:
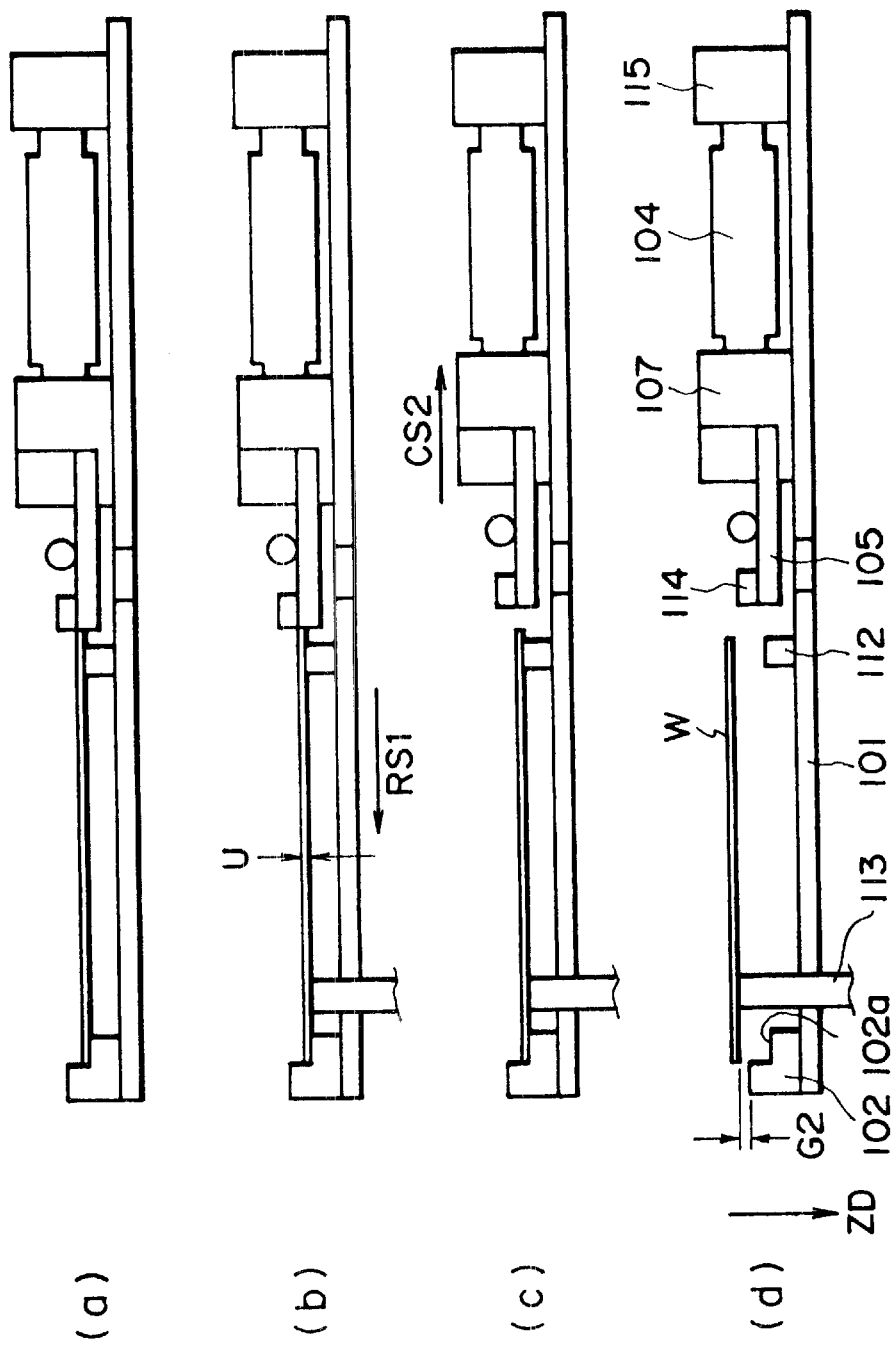
FIG. 24 is a schematic view for explaining a sending operation of the hand mechanism of FIG. 20.

FIG. 20 is a top plan view of a robot hand as a first example, in a state before gripping a wafer (hereinafter, "un-gripped state"). FIG. 21 is a side view of the robot hand. FIG. 22 is a similar top plan view of the robot hand, but showing it in a state after gripping a wafer. FIG. 23 illustrates the procedure for picking up (unloading) a wafer on a wafer table, by using this robot hand. FIG. 24 illustrates the procedure for placing (loading) a wafer on a wafer table, by using the robot hand.

As shown in FIGS. 20 and 21, the robot hand 100 has a supporting base table 101, which, when viewed from above a wafer W, has a forked shape having two parallel extensions. Two fixed pawls 102 are provided at the free ends of these extensions. On the other hand, in an opposite direction thereto, there are two movable pawls 103 having rollers 114. These fixed pawls 102 and movable pawls 103 are disposed so as to be engaged with a circumferential periphery of the wafer W when the same is gripped. The fixed pawls 102 may be made rotatable in response to engagement with the wafer circumferential periphery.

Each fixed pawl 102 is fixedly mounted at a free end of the fork described above, and its engagement portion with the wafer edge face is formed into a circular shape (or arcuate shape). Also, there is a wafer abutment 102a formed in a portion of the fixed pawl, for supporting the wafer W.

The movable pawls 103 have a slider 107 movably mounted on the supporting base table 101 through a linear motion bearing (roller type), two arms 105 swingably mounted on this slider 107 through hinges 106, and a spring 108 for applying a tension holding force to these arms 105 through spring hooks 109. The rollers 114 mounted at the free ends of the arms 105 for engagement with the wafer edge face are made rotatable. The two arms 105 are pulled toward each other by the spring 108, and also they are made swingable in predetermined directions $\theta_1$ and $\theta_2$, respectively. The slider 107 is connected to an end of a bellows 104 which can be expanded and contracted in response to a pneumatic pressure. The other end of the bellows 104 is connected to a bellows table 115, fixedly mounted on the supporting base table 101.

The expansion/contraction operation of the bellows 104 is limited by stopper means (not shown) which is provided in a portion of the slider 107. The operational stroke of the bellows ranges from a smallest distance necessary for obtaining a sufficient gripping force at the fixed pawls 102 to a largest distance for obtaining a sufficient space for receiving a wafer.

A single air tube 116 is connected to this bellows 104, to supply an air to the bellows. Another end (not shown) of this air tube is connected to an electromagnetic valve (not shown) by which pressurization and de-pressurization of the bellows 104 can be interchangeably controlled, from the outside of the system. With the structure of drive control using a single air tube such as at 116, the mechanism of the robot can be advantageously made very simple.

Disposed on the supporting table 101 is a supporting pin 112 for supporting a wafer W in cooperation with the wafer abutments 102a, mounted on the fixed pawls 102.

In FIGS. 20 and 22, a reference numeral 111 denotes the center of the wafer W, and a reference numeral 113 denotes a wafer table (corresponding to the supporting pins 5 in FIG. 6) which is on the processing unit side for processing the wafer.

The gripping operation for holding a wafer W through the robot hand 100 of the structure described above, as well as its un-gripping operation for releasing the gripping, will be described below.

FIG. 20 shows the un-gripped state. Before a wafer is loaded, the inside of the bellows 104 is evacuated to vacuum through the air tube 116, by the control of the electromagnetic valve (not shown). Through this vacuum attraction, the bellows 104 has been contracted in a direction of an arrow CS2 (FIG. 21), while taking the bellows table 115 as a fixed point. Also, the slider 107 connected to the bellows 104 and movably mounted on the supporting base table 101 for sliding motion along an X—X axis, has been shifted in the same direction CS2 by an amount corresponding to the contracted length of the bellows. Further, the arms 105 connected to the slider 107 have been shifted together with the slider 107, such that a sufficient space for placing a wafer W is defined between the rollers 114, mounted on the free ends of the arms and the pawls 102. This state is the un-gripped state. In this state, the wafer W is placed on the top faces of the supporting pin 112 and of the wafer abutments 102a of the fixed pawls 102, fixedly mounted on the supporting table 101.

Next, the gripping operation for gripping the wafer W placed in this un-gripped state, will be described with reference to FIG. 22.

In order to grip the wafer W placed un-gripped, compressed air is supplied into the bellows 104. Changing the supply to this compressed air is executed by means of the electromagnetic valve, not shown. With the thus supplied compressed air, the bellows 104 is expanded in a direction of an arrow CS1. Also, with this expansion, the movable pawl structure 103 comprising the slider 107, the arms 105, the rollers 114, the spring 108, and the like, shifts in the direction CS1. In the course of this movement, the rollers 114 engage with the edge face of the wafer W and press the wafer W until it abuts against the fixed pawls 102. At this moment, the movement of the wafer W is completed, so that the two fixed pawls 102 and the two rollers 114 engage with the circumferential periphery of the wafer W. However, at this moment, the wafer W is not gripped sufficiently. Thus, the movable pawl 103 is then pressed more, by which the rollers 114 which are rotatably mounted on the free ends of the two arms 105 are moved, while being rotated, along the circumferential edge of the wafer W, and by which, on the other hand, the two arms 105 pulled to each other by the spring 108 are pivotably moved in $\theta 1$ and $\theta 2$ directions, about their hinges 106, by predetermined angles. Since the spring 108 applies a tension force sufficiently holding the wafer W as the two arms 105 are opened by a predetermined angle, the wafer W is thus gripped between the two rollers 114 and the two fixed pawls 102 with a sufficient holding force. At this moment, by means of the stopper (not shown) provided on the slider 107, the expansion motion of the bellows 104 is stopped, and this state is kept. This is the gripped state.

The swinging motion of the arms 105 in the gripping operation will be explained in greater detail. At the moment whereat the wafer W pressed by the rollers 114 is brought into engagement with the fixed pawls 102, since the arms 105 are not yet swingingly moved in $\theta 1$ and $\theta 2$ directions, no sufficient force for gripping the wafer W is not applied to the rollers 114. When the movable pawls 103 are pressed more in the direction CS1, in response, the rollers 114 move along the peripheral edge of the wafer W while being rotated, such that the arms 105 are gradually swingingly moved in $\theta 1$ and $\theta 2$ directions, respectively. With this swinging motion, the spring 108 is extended by which a gripping force is gradually produced. At the moment whereat a sufficient gripping force is produced, the gripping operation is accomplished. Namely, this structure provides a mechanism for gradually applying the gripping, rather than applying the grip suddenly. As a result, the impact by the gripping is very small, and production of particles by the impact can be reduced effectively.

Although the gripping operation described above concerns a wafer having a notch of circular shape, if a wafer having an orientation flat with a large notch at the circumferential periphery is used, similar operations such as described above may be performed once the orientation of the orientation flat is fixed in a particular direction.

In the robot hand 100 described above, the movable pawl 103 is moved by means of a bellows 104 being expanded and contracted by a pneumatic pressure. Thus, as compared with a case where a drive is provided by a sliding cylinder, the sliding motion area can be reduced such that particle production can be suppressed. Also, practically, there occurs no air leakage. Further, when the movable pawl 103 engages with the wafer, the two arms 105 connected to each other by the spring 108 are swingingly moved to be opened to thereby absorb any impact. Therefore, the impact is very small, and particle production due to the impact can be reduced.

Further, rollers 114 are provided at the free ends of the pawl 103, and these rollers are arranged to move along the wafer circumference while being rotated. Thus, particle production due to sliding motion there can be prevented. Additionally, the wafer bottom face side structure for conveyance has a forked shape, and there is a large void. As a result, even when a high-temperature wafer W is to be conveyed, the heat collected between the wafer W bottom face and the robot hand 100 can be released effectively. Therefore, the heat distributions on the top face and bottom face of the wafer W are made uniform, and unwanted warp of the wafer can be avoided. This accomplishes assured gripping of the wafer W.

Next, referring to FIGS. 23 and 24, loading and unloading operations of the robot hand 100 will be explained.

The following description will be made on an assumption that the robot hand 100 moves along an X—X axis (FIG. 20) containing a portion about the center 111 of the wafer W, and that a direction along this axial direction in which the robot hand 100 goes toward a wafer table 113 is denoted by RS1 while a direction in which the robot hand 100 moves away from the wafer table 113 is denoted by RS2. Also, in the upward and downward relative movement of the robot hand 100 relative to the wafer W on the wafer table 113, the upward direction is denoted by ZU while the downward direction is denoted by ZD.

FIG. 23 illustrates an unloading (receiving) operation. In order to move the robot hand 100 to receive a wafer W placed at a predetermined position on the wafer table 113, first, the robot hand 100 is moved in the direction RS1 while a predetermined gap G2 is kept between the bottom face of the wafer W, placed on the table 113, and the top faces of the fixed pawls 102 at the free ends of the hand so that they do not contact with each other. The robot hand 100 is moved to a position shown in a portion (a) in FIG. 23. At this position, as illustrated, a gap G1 is defined between the wafer contact surface of the fixed pawl 102 and the end face of the wafer W. Thus, as the robot hand 100 moves in the direction ZU, the wafer contact surface of the fixed pawl 102 does not contact with the end face of the wafer W. At this time, the movable pawl 103 of the robot hand 100 is in the un-gripped state.

In this state, the robot hand 100 moves upwardly in the direction ZU, to a position shown in a portion (b) of FIG. 23. In the course of this movement, the bottom face of the wafer W is supported by the wafer abutment 102a of the fixed pawl 102 of the robot hand 100 and by the supporting pin 112, such that the wafer is transferred to the robot hand 100 from the wafer table 113. Here, as regards the movement distance of the robot hand 100 in the direction ZU, an extent with which the bottom face of the wafer W can be released away from the wafer table 113 and a clearance U can be formed therebetween, to avoid interference with the subsequent motion of the robot hand 100, will be sufficient.

Subsequently, as shown in a portion (c) in FIG. 23, at the moment where the robot hand 100 has moved in the RS2 direction by a predetermined distance S, the movable pawl 102 is moved in the direction CS1 to thereby grip the wafer W. Here, as regards the distance S for moving the robot hand 100, if the wafer table 113 is provided by a wafer cassette, the distance should be of an extent which assures that, when the wafer W moves by an amount corresponding to the gap G1 as the same is gripped, the wafer W does not abut against a wafer stopper, not shown (usually, it is provided in the depth direction of the wafer cassette, for positioning of the wafer in the depth direction).

After the movable pawl 103 grips the wafer W as described above, while keeping the grip, the robot hand 100 moves further in the RS2 direction. At the origin position, it stands by for a subsequent operation. With these sequential operations, the wafer unloading (receiving) operation is accomplished.

The wafer loading (sending) operation will now be described. First, the robot hand having a wafer W gripped thereon is moved in the direction RS1, toward the position of the wafer table 113, as shown in a portion (b) of FIG. 24. Here, in order to prevent contact between the bottom face of the wafer W and the top face of the wafer table 113, a clearance U is kept therebetween. The movement of the robot hand 100 is continued until the center of the wafer W reaches a predetermined position on the wafer table 113 as described hereinbefore, and then, the motion is stopped. This is the position shown in the portion (b) of FIG. 24. This position differs from the position shown in the portion (a) of FIG. 23 in the wafer unloading operation described above. This is because of a positional deviation resulting from the clearance G1 to the wafer, in the wafer unloading operation.

Once the position of the robot hand 100 is determined, then, the sequence goes to the operation for placing the wafer W upon the wafer table 113. Thus, as shown in a portion (c) of FIG. 24, first the grip of the wafer W is released (un-gripped state). Namely, the movable pawl 103 is moved in the direction CS2 to thereby release the gripping. Then, while keeping this state, the robot hand 100 is moved downwardly, in the direction ZD. In the course of this downward motion, the wafer W is transferred onto the wafer table 113. The robot hand 100 continues its downward motion until a clearance G2 is defined between the bottom face of the wafer W and the top face of the fixed pawl 102. As the clearance G2 is assured, the downward motion is stopped. This corresponds to the state shown in a portion (d) of FIG. 24. Subsequently, while keeping its stopped position with respect to the downward direction, the robot hand 100 moves in the direction RS2. At the origin position, it stands by for a subsequent operation. With these sequential operations, the wafer loading (sending) operation is accomplished.

As described above, the teaching position for the robot hand is changed, for the wafer loading operation and wafer unloading operation. This effectively avoids unexpected contact between the robot hand 100 and the wafer W. Further, by setting the wafer gripping timing in the wafer unloading (receiving) operation with a delay corresponding to the movement by a predetermined distance S from the wafer receiving position, unexpected collision between the wafer W and the wafer table side mechanism can be prevented. Thus, the structure is very effective in respect to prevention of damage of the wafer as well as prevention of particle production.

It will be readily understood that similar operation control as has been described with reference to FIG. 15 or 18 may be applied to the wafer loading and unloading operations in this embodiment.

[Fourth Embodiment]

Figure 25:
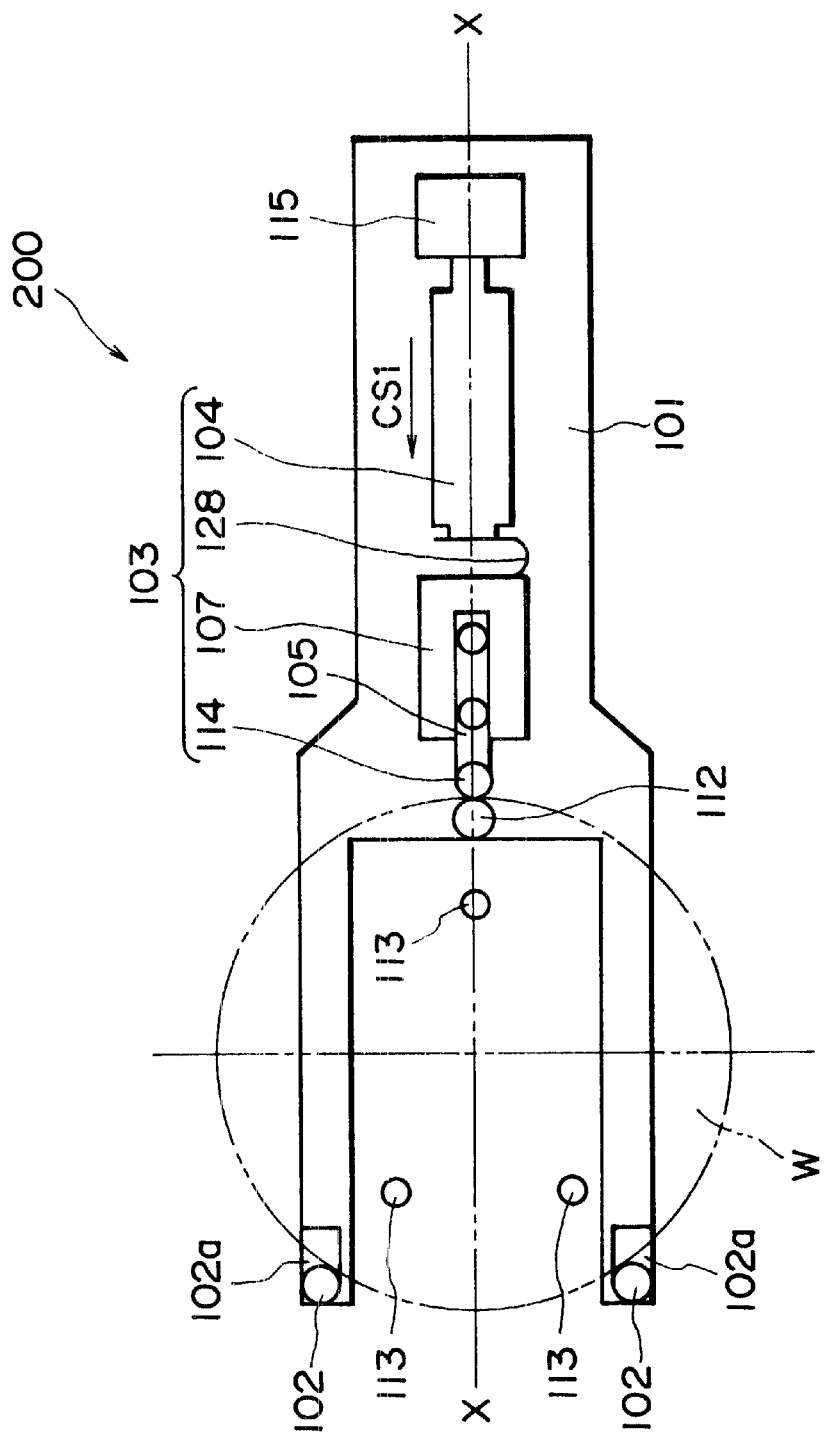
FIG. 25 is a top plan view of a hand mechanism in a fourth embodiment of the present invention.

FIG. 25 shows another example of a robot hand. In this robot hand 200, a movable pawl 103 has a single arm 105. Also, a slider 107 and a bellows 104 are connected with each other by means of a U-shaped spring 128 for impact absorption. The remaining structure is essentially the same as that of the robot hand 100 shown in FIG. 20. With this robot hand

200, substantially the same advantageous effects as attainable with the robot hand 100 of FIG. 20 are provided.

[Fifth Embodiment]

Figure 26:
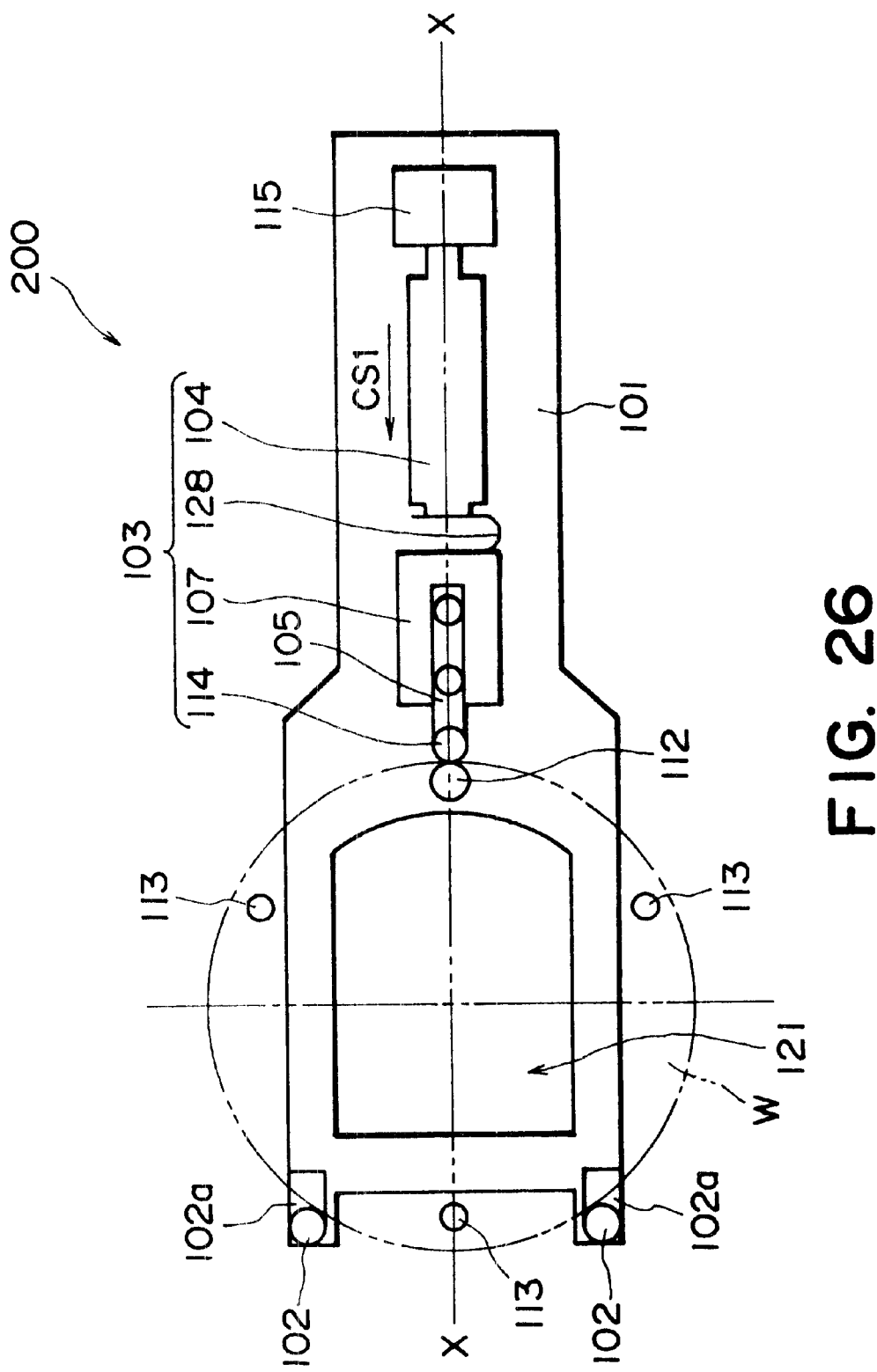
FIG. 26 is a top plan view of a hand mechanism in a fifth embodiment of the present invention.

FIG. 26 shows a further example of a robot hand. This robot hand 300 has a similar structure as of the robot hand 200 of FIG. 25, with an exception that the free ends of a forked-shape portion of a supporting base table 101 are connected with each other, and that a large evacuation space 121 is opened at the central portion of the wafer W to prevent collection of heat between the wafer W and the supporting table 101. With this structure, the rigidity of the fixed pawls 102 is enlarged. Therefore, the fixed pawls 102 do not easily shift, such that the reliability of wafer gripping is improved.

While the present invention has been described above with reference to some preferred embodiments thereof, the invention is not limited to the disclosed forms. For example, although a teaching position or positions are added in these examples to enable two-stage switching (higher speed and lower speed switching) of the operation speed with respect to a certain axis, more teaching positions may be added to enable three-stage or more switching of the set speed. Further, the present invention is applicable also to various conveyance systems wherein substrates are to be sequentially conveyed through plural units by means of a robot. Also, a bellows to be used in a hand mechanism of the present invention may be driven by any other sources than air described above, such as a liquid, if appropriate.

In accordance with the present invention, as described hereinbefore, an impact between a substrate and a substrate conveying robot or a processing unit as the substrate is to be transferred between the conveying robot and various processing units can be reduced significantly. Also, any shift as the substrate is gripped can be reduced effectively. Therefore, assured conveyance of a substrate is accomplished.

Further, a substrate conveying hand mechanism of the present invention includes reduced sliding portions, such that the present invention accomplishes a substrate conveying system of small particle production and small wafer contamination.

While the invention has been described with reference to the structures disclosed herein, it is not confined to the details set forth and this application is intended to cover such modifications or changes as may come within the purposes of the improvements or the scope of the following claims.

What is claimed is:

1. A substrate conveying system, comprising:
   a robot arm with substrate holding means for holding a substrate, said robot arm being operable to move said substrate holding means to a predetermined position to enable transfer of the substrate; and
   control means for controlling movement of said substrate holding means to said predetermined position, said control means having at least one axis and being operable to control the movement of said substrate holding means related to said at least one axis, with respect to at least four, first to fourth, positions, wherein the first position is a movement start position where the movement of said substrate holding means is to be started, wherein the second position is a first speed changing position where a movement speed of said substrate holding means is to be changed from a first set speed to a second set speed, wherein the third position is a second speed changing position where the movement speed of said substrate holding means is to be changed from the second set speed to the first set speed, and wherein the fourth position is a movement completion position where the movement of said substrate holding means is to be completed.

2. A substrate conveying system according to claim 1, wherein the transfer of the substrate is performed during movement of said substrate holding means from the first speed changing position to the second speed changing position.

3. A substrate conveying system according to claim 1, wherein the second set speed is slower than the first set speed.

4. A substrate conveying system according to claim 1, wherein said substrate holding means includes a holding mechanism for mechanically holding the substrate.

5. A substrate conveying method, comprising the steps of:
   holding a substrate through a substrate holding device provided on a robot arm; and
   moving the substrate holding device to a predetermined position in accordance with at least one axis, for transfer of the substrate,
   wherein said moving step for moving the substrate holding device in accordance with the at least one axis includes (i) moving, at a first set speed, the substrate holding device to a movement start position where the movement of the substrate holding device is to be started, (ii) moving, at the first set speed, the substrate holding device to a first speed changing position where a movement speed of the substrate holding device is to be changed from the first set speed to a second set speed, (iii) moving, at the second set speed, the substrate holding device to a second speed changing position where the movement speed of the substrate holding device is to be changed from the second set speed to the first set speed, and (iv) moving, at the first set speed, the substrate holding device to a movement completion position where the movement of the substrate holding device is to be completed.

6. A method according to claim 5, wherein the transfer of the substrate is performed during movement, at the second set speed, of the substrate holding device from the first speed changing position to the second speed changing position.

7. A method according to claim 5, wherein the second set speed is slower than the first set speed.

8. A method according to claim 5, wherein the substrate holding device includes a holding mechanism for mechanically holding the substrate.

9. A semiconductor device manufacturing method including a step for processing a substrate conveyed in accordance with a substrate conveying method as recited in claim 5.

10. A substrate conveying system, comprising:
   a robot arm with substrate holding means for holding a substrate, said robot arm being operable to move said substrate holding means to a predetermined position to enable transfer of the substrate; and
   control means for controlling movement of said substrate holding means to said predetermined position, said control means having at least two axes and being operable to control the movement of said substrate holding means related to said at least two axes, with respect to at least seven, first to seventh, positions, wherein the first position is a movement start position for a first axis where the movement of said substrate holding means with respect to the first axis is to be started, wherein the second position is a movement start position for a second axis where the movement of said substrate holding means with respect to the second axis is to be started, wherein the third position is a first speed changing position for the second axis where a movement speed of said substrate holding means with respect to the second axis is to be changed from a first set speed for the second axis to a second set speed for the second axis, wherein the fourth position is a second speed changing position for the second axis where the movement speed of said substrate holding means with respect to the second axis is to be changed from the second set speed for the second axis to the first set speed for the second axis, wherein the fifth position is a second speed changing position for the first axis where the movement speed of said substrate holding means with respect to the first axis is to be changed from a second set speed for the first axis to a first set speed for the first axis, wherein the sixth position is a movement completion position for the first axis where the movement of said substrate holding means with respect to the first axis is to be completed, and wherein the seventh position is a movement completion position for the second axis where the movement of said substrate holding means with respect to the second axis is to be completed.

11. A substrate conveying system according to claim 10, wherein the transfer of the substrate is performed during movement of said substrate holding means from the first speed changing position for the second axis to the second speed changing position for the second axis.

12. A substrate conveying system according to claim 10, wherein the second set speed for the second axis is slower than the first set speed for the second axis, and wherein the second set speed for the first axis is slower than the first set speed for the first axis.

13. A substrate conveying system according to claim 10, wherein said substrate holding means includes a holding mechanism for mechanically holding the substrate.

14. A substrate conveying method, comprising the steps of:
holding a substrate through a substrate holding device provided on a robot arm; and
moving the substrate holding device to a predetermined position in accordance with at least two axes, to enable transfer of the substrate,
wherein said moving step for moving the substrate holding device in accordance with at least two axes includes (i) moving, at a first set speed with respect to a first axis and also at a first set speed with respect to a second axis, the substrate holding device to a movement start position for the first axis where the movement of the substrate holding device with respect to the first axis is to be started, (ii) moving, at the first set speed with respect to the first axis, the substrate holding device to a movement start position for the second axis where the movement of the substrate holding device with respect to the second axis is to be started, (iii) moving, at the first set speed with respect to the second axis, the substrate holding device to a first speed changing position for the second axis where a movement speed of the substrate holding device is to be changed from the first set speed for the second axis to a second set speed for the second axis, (iv) moving, at the second set speed with respect to the second axis, the substrate holding device to a second speed changing position for the second axis where the movement speed of the substrate holding device is to be changed from the second set speed for the second axis to the first set speed for the second axis, (v) moving, at the first set speed with respect to the second axis, the substrate holding device to a movement completion position for the second axis where the movement of the substrate holding device with respect to the second axis is to be completed, (vi) moving, at the second set speed with respect to the first axis, the substrate holding device to a second speed changing position for the first axis where the movement speed of the substrate holding device is to be changed from a second set speed for the first axis to the first set speed for the first axis, and (vii) moving, at the first set speed with respect to the first axis, the substrate holding device to a movement completion position for the first axis where the movement of the substrate holding means with respect to the first axis is to be completed.

15. A method according to claim 14, wherein the transfer of the substrate is performed during movement, at the second set speed with respect to the second axis, of the substrate holding device from the first speed changing position for the second axis to the second speed changing position for the second axis.

16. A method according to claim 14, wherein the second set speed for the second axis is slower than the first set speed for the second axis, and wherein the second set speed for the first axis is slower than the first set speed for the first axis.

17. A method according to claim 14, wherein the substrate holding device includes a holding mechanism for mechanically holding the substrate.

18. A substrate conveying hand mechanism, comprising:
fixed pawls provided at least at two locations;
at least one movable pawl movably disposed with a variable distance to said fixed pawls, for sandwiching and holding a substrate between the same and said fixed pawls; and
bellows means connected to said at least one movable pawl and being able to be expanded and contracted through actuation of a fluid, to change the distance between said at least one movable pawl and said fixed pawls.

19. A substrate conveying hand mechanism according to claim 18, wherein said at least one movable pawl includes a pair of parallel arms each being swingably supported, and a tension spring for applying a tension urging force between said parallel arms, and wherein a substrate can be held between said parallel arms as they are opened against the tension spring.

20. A substrate conveying hand mechanism according to claim 18, wherein said at least one movable pawl includes an engagement adapted to be in roll engagement with a substrate when the same is held.

21. A substrate conveying hand mechanism according to claim 18, further comprising an opening formed in a face to be opposed to the substrate, for releasing heat from the substrate as the same is held.

22. A semiconductor manufacturing apparatus including a substrate conveying hand mechanism as recited in claim 18.

23. A substrate conveying method, comprising the steps of:
holding a substrate through a substrate holding device provided on a robot arm; and
moving the substrate holding device in accordance with at least one axis, to a predetermined position, for transfer of the substrate,
wherein said substrate holding device satisfies a relation with respect to said at least one axis that a position of said substrate holding device for receiving the substrate differs from a position of said substrate holding device for sending the substrate therefrom.

24. A semiconductor manufacturing apparatus including a substrate conveying system as recited in claim 1.

25. A semiconductor device manufacturing method including a step for processing a substrate conveyed in accordance with a substrate conveying method as recited in claim 23.

26. A substrate conveying system, comprising:
   a robot arm having a substrate holding portion for holding a semiconductor substrate, said robot arm being operable to move said substrate holding portion to transfer a semiconductor substrate between said substrate holding portion and a semiconductor process performing unit; and
   a control unit for controlling the movement of said substrate holding portion,
   wherein said control unit is operable to switch the movement speed of said substrate holding portion to a lower speed, before the semiconductor substrate is transferred.

27. A substrate conveying system according to claim 26, wherein said control system is operable to switch the movement speed of said substrate holding portion to a higher speed, after the semiconductor substrate is transferred.

28. A substrate conveying system according to claim 27, wherein the movement speed of the substrate holding portion before the substrate is transferred and the movement speed of the substrate holding portion after the substrate is transferred are equal to each other.

29. A substrate conveying system according to claim 26, wherein the movement of the substrate holding portion is along a direction perpendicular to a holding plane along which the substrate is held.

30. A substrate conveying system according to claim 26, wherein said robot arm has first and second substrate holding portions, said first substrate holding portion functions to receive a semiconductor substrate from said semiconductor process performing unit and to hold the substrate, and said second substrate holding portion functions to put a semiconductor substrate over said semiconductor process performing unit.

31. A substrate conveying system according to claim 26, wherein said substrate holding portion includes a mechanism for mechanically holding the substrate.

32. A substrate conveying system according to claim 26, wherein said semiconductor process performing unit is adapted to perform an ashing process to a wafer.

33. A substrate conveying method, comprising:
   providing a robot arm having a substrate holding portion for holding a semiconductor substrate;
   moving, using the robot arm, the substrate holding portion to transfer a semiconductor substrate between said substrate holding portion and a semiconductor process performing unit; and
   controlling, using a control unit, the movement of the substrate holding portion,
   wherein the control unit switches the movement speed of the substrate holding portion to a lower speed, before the semiconductor substrate is transferred.

34. A method according to claim 33, wherein said control system is operable to switch the movement speed of said substrate holding portion to a higher speed, after the semiconductor substrate is transferred.

35. A method according to claim 34, wherein the movement speed of the substrate holding portion before the substrate is transferred and the movement speed of the substrate holding portion after the substrate is transferred are equal to each other.

36. A method according to claim 33, wherein the movement of the substrate holding portion is along a direction perpendicular to a holding plane along which the substrate is held.

37. A semiconductor manufacturing apparatus, comprising:
   a robot arm having a substrate holding portion for holding a semiconductor substrate, said robot arm being operable to move said substrate holding portion to transfer a semiconductor substrate between said substrate holding portion and a semiconductor process performing unit, which manufactures a semiconductor; and
   a control unit for controlling the movement of said substrate holding portion,
   wherein said control unit is operable to switch the movement speed of said substrate holding portion to a lower speed, before the semiconductor substrate is transferred.

38. An apparatus according to claim 37, wherein said control system is operable to switch the movement speed of said substrate holding portion to a higher speed, after the semiconductor substrate is transferred.

39. An apparatus according to claim 38, wherein the movement speed of the substrate holding portion before the substrate is transferred and the movement speed of the substrate holding portion after the substrate is transferred are equal to each other.

40. An apparatus according to claim 37, wherein the movement of the substrate holding portion is along a direction perpendicular to a holding plane along which the substrate is held.

41. A semiconductor manufacturing method, comprising:
   providing a robot arm having a substrate holding portion for holding a semiconductor substrate;
   moving, using the robot arm, the substrate holding portion to transfer a semiconductor substrate between the substrate holding portion and a semiconductor process performing unit, which manufactures a semiconductor; and
   controlling, using a control unit, the movement of the substrate holding portion,
   wherein the control unit switches the movement speed of the substrate holding portion to a lower speed, before the semiconductor substrate is transferred.

42. A method according to claim 41, further comprising switching, with the control system, the movement speed of the substrate holding portion to a higher speed, after the semiconductor substrate is transferred.

43. A method according to claim 42, wherein the movement speed of the substrate holding portion before the substrate is transferred and the movement speed of the substrate holding portion after the substrate is transferred are equal to each other.

44. A method according to claim 41, wherein the movement of the substrate holding portion is along a direction perpendicular to a holding plane along which the substrate is held.

* * * * *

UNITED STATES PATENT AND TRADEMARK OFFICE
CERTIFICATE OF CORRECTION

PATENT NO. : 6,438,458 B2
DATED : August 20, 2002
INVENTOR(S) : Hiroshi Shimoike et al.

It is certified that error appears in the above-identified patent and that said Letters Patent is hereby corrected as shown below:

Title page,
Item [56], References Cited, OTHER PUBLICATIONS, in "Goldberg et al.," "Coupling Assebly Plans Into Hard Automation," should read -- Compiling Assembly Plans Into Hard Automation, --.

Column 1,
Line 55, "the;con-" should read -- the con- --.

Column 8,
Line 20, "pins.5" should read -- pins 5 --.

Column 10,
Line 31, "can not" should read -- cannot --.

Column 11,
Line 7, "speed $S_n$" should read -- speed $S_n$. --.

Column 14,
Line 41, "not" should be deleted.

Signed and Sealed this

Seventh Day of January, 2003

JAMES E. ROGAN
*Director of the United States Patent and Trademark Office*